US012484877B2

(12) United States Patent
Wilmering et al.

(10) Patent No.: US 12,484,877 B2
(45) Date of Patent: Dec. 2, 2025

(54) ULTRASOUND SCANNER EYE PIECE

(71) Applicant: ArcScan, Inc., Golden, CO (US)

(72) Inventors: Tom Wilmering, Eldorado Springs, CO (US); Johan E. Giphart, Superior, CO (US)

(73) Assignee: ArcScan, Inc., CO (US)

( * ) Notice: Subject to any disclaimer, the term of this patent is extended or adjusted under 35 U.S.C. 154(b) by 61 days.

(21) Appl. No.: 17/984,917

(22) Filed: Nov. 10, 2022

(65) Prior Publication Data

US 2023/0157663 A1     May 25, 2023

Related U.S. Application Data

(60) Provisional application No. 63/277,972, filed on Nov. 10, 2021.

(51) Int. Cl.
*A61B 8/10* (2006.01)
*A61B 8/00* (2006.01)

(52) U.S. Cl.
CPC .............. *A61B 8/10* (2013.01); *A61B 8/4281* (2013.01)

(58) Field of Classification Search
CPC ........ A61B 8/10; A61B 8/4209; A61B 8/4281
See application file for complete search history.

(56) References Cited

U.S. PATENT DOCUMENTS

| | | | | |
|---|---|---|---|---|
| 4,937,115 A | * | 6/1990 | Leatherman | B32B 5/18 428/483 |
| 6,315,727 B1 | * | 11/2001 | Coleman | A61B 8/10 600/452 |
| 2015/0238166 A1 | * | 8/2015 | Heath | A61B 8/10 351/205 |

* cited by examiner

*Primary Examiner* — Michael J Carey
*Assistant Examiner* — Maria Christina Talty
(74) *Attorney, Agent, or Firm* — Sheridan Ross P.C.

(57) ABSTRACT

The present disclosure is directed to improvement of a precision ultrasound scanner for imaging the human eye and in particular to method for the manufacture and assembly of an eye piece suitable for use with an ultrasonic arc scanning device. The method disclosed herein describes an improved eye piece for ultrasound imaging that reduces saline leakage around its optically and acoustically transparent membrane and improves the efficiency of assembly.

18 Claims, 20 Drawing Sheets

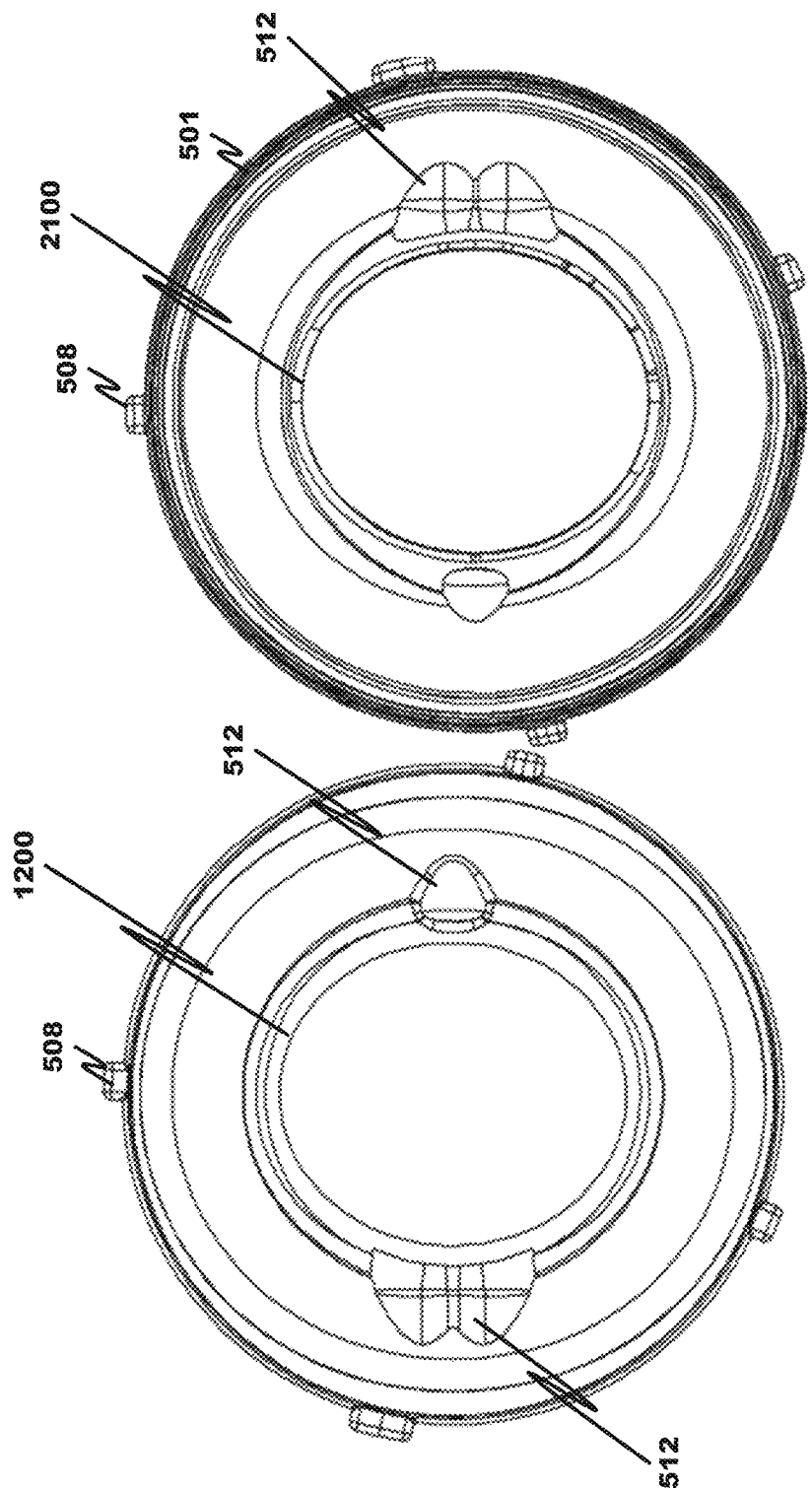

ULTRASOUND SCANNER EYE PIECE

CROSS-REFERENCE TO RELATED APPLICATIONS

This application claims the benefits, under 35 U.S.C. § 119(e), of U.S. Patent No. 63/277,972 entitled "Ultrasound Scanner Eye Piece Construction Method" filed Nov. 10, 2021, which is incorporated herein by reference.

FIELD OF INVENTION

The present disclosure relates to the manufacture and assembly of an eye piece suitable for use with an ultrasonic arc scanning device.

BACKGROUND OF THE INVENTION

Ultrasonic imaging has found use in accurate and reproducible measurements of structures of the eye, such as, for example, the cornea and lens capsule. Such measurements provide an ophthalmic surgeon valuable information that can be used to guide various surgical procedures for correcting refractive errors such as LASIK and lens replacement. They also provide diagnostic information after surgery has been performed to assess the geometrical location of corneal features such as the LASIK scar and lens features such as lens connection, position and orientation. This allows the surgeon to assess post-surgical changes in the cornea or lens and to take steps to correct any problems that develop.

Except for on-axis measurements, dimensions and locations of eye components behind the iris cannot be fully determined by optical means. Ultrasonic imaging in the frequency range of about 5 MHz to about 80 MHz can be applied to make accurate and precise measurements of structures of the eye, such as the cornea, lens capsule, ciliary muscle and the like.

An ultrasound scanning apparatus is described in the following issued US patents, all of which are incorporated herein by reference:
1. U.S. Pat. No. 7,048,690 "Precision Ultrasound Measurement for Intraocular Lens Placement";
2. U.S. Pat. No. 8,758,252 "Innovative Components for an Ultrasonic Arc Scanning Apparatus";
3. U.S. Pat. No. 8,496,588 "Procedures for an Ultrasonic Arc Scanning Apparatus"
4. U.S. Pat. No. 8,317,709 "Alignment and Imaging of an Eye with an Ultrasonic Scanner"
5. U.S. Pat. No. 9,149,254 "Alignment and Imaging of an Eye with an Ultrasonic Scanner"
6. U.S. Pat. No. 9,597,059 "Tracking Unintended Eye Movements in an Ultrasonic Scan of the Eye"
7. U.S. Pat. No. 9,320,427 "Combination Optical and Ultrasonic Imaging of an Eye"
8. U.S. Pat. No. 10,736,605 Disposable Eyepiece System for an Ultrasonic Eye Scanning Apparatus An arc scanner is an ultrasound scanning device utilizing a transducer that both sends and receives pulses as it moves along an arcuate guide track. The arcuate guide track has a center of curvature whose position can be moved to scan different curved surfaces. Later versions of arc scanners have mechanisms that allow the radius of curvature of the scanner to be changed. In this type of scanner, a transducer is moved along an arcuate guide track whose center of curvature can be changed and set approximately at the center of curvature of the eye surface of interest. The transducer generates many acoustic pulses as it moves along the arcuate guide track. These pulses reflect off specular surfaces and other tissue interfaces within the eye. Each individual return pulse is detected and digitized to produce a series of A-scans. The A-scans can then be combined to form a cross-sectional image of the eye features of interest. The image combining A-scans is commonly called a B scan.

At a center frequency of about 38 MHz, a typical arc scanner has an axial resolution of about 20 microns and a lateral resolution of about 150 microns. The reproducibility of arc scanner images is typically about 2 microns.

The ultrasonic system described herein is capable of accurately moving an ultrasound transducer with respect to a known reference point on a patient's head. Further improvements allow for tracking of unintended eye motions during scanning as disclosed in U.S. Pat. No. 9,597,059 entitled "Tracking Unintended Eye Movements in an Ultrasonic Scan of the Eye".

Ultrasonic imaging requires a liquid medium to be interposed between the object being imaged and the transducer, which requires, in turn, that the eye, the transducer and the path between them be at all times immersed in a liquid medium. Concern for safety of the cornea introduces the practical requirement that the liquid medium be either pure water or normal saline water solution. There are reasons to prefer that the medium be pure water (e.g., distilled water) or physiologic saline (also known as normal saline) but the embodiments do not exclude other media suitable for conducting acoustic energy in the form of ultrasound. Most other media present an increased danger to the patient's eye, even with a barrier interposed between the eye and the ultrasonic transducer. Barriers can leak or be breached, allowing the liquids on either side to mix, thus bringing a potentially harmful material into contact with the eye.

An eyepiece serves to complete a continuous acoustic path for ultrasonic scanning, that path extending from the transducer to the surface of the patient's eye. The eyepiece also separates the water in which the patient's eye is immersed from the water in the chamber in which the ultrasound transducer and guide track assembly are contained. Finally, the eyepiece provides a steady rest for the patient and helps the patient to remain steady during a scan. To be practical, the eyepiece should be free from frequent leakage problems, should be comfortable to the patient and its manufacturing cost should be low since it should be replaced for every new patient.

Due to the need for an eye seal to provide a continuous medium for the ultrasound signal to travel between the transducer, any scanning device has a limitation in the range of movement the transducer can make relative to the eye. The range of the scanning device can be expanded to cover more of the anterior segment by introducing intentional and controlled eye movements and scanning the newly exposed portion of the eye that can now be reached. Registration techniques can be used to combine the scans of different eye positions to create a more complete composite image of the anterior segment of the eye.

There remains, therefore, a need for an eye piece system for use in ultrasound imaging that is inexpensive to manufacture and assemble.

SUMMARY OF THE INVENTION

These and other needs are addressed by the present disclosure. The various embodiments and configurations of the present disclosure are directed generally to ultrasound imaging of a human eye and particularly to the manufacture and assembly of an eye piece suitable for use with an ultrasonic arc scanning device.

In an embodiment, an eyepiece for an ultrasonic imaging device can include:
- a base member having a central opening;
- an eye cup comprising a central opening and configured to engage an eye socket of a patient;
- a welding ring positioned between at least a portion of the eye cup and the base member; and
- a liquid impermeable membrane positioned between the welding ring and the base member, wherein at least of the following is true:
  - (a) the welding ring comprises an energy director on a lower surface, the energy director configured to be ultrasonically melted when in contact with the base member; and
  - (b) the eye cup comprises a raised annular member extending outwardly from the eye cup and configured to contact a portion of the base member to inhibit leakage of liquid at an interface between the eye cup and the base member.

In an embodiment, an imaging device can include:
- an eyepiece for receiving an eye of a patient, the eyepiece comprising a welding ring and a base member;
- a first liquid-containing chamber in contact with an ultrasonic transducer;
- a second liquid-containing chamber in contact with the patient's eye to be imaged by the ultrasonic transducer; and
- a liquid impermeable barrier positioned between the welding ring and base member and separating the first and second liquid-containing chambers, wherein at least one of the following is true:
  - (a) the welding ring comprises an energy director on a lower surface, the energy director configured to be ultrasonically melted when in contact with the base member; and
  - (b) the eye cup comprises a raised annular member extending outwardly from the eye cup and configured to contact a portion of the base member to inhibit leakage of liquid at an interface between the eye cup and the base member.

In an embodiment, a method of manufacturing an eyepiece for ultrasound imaging can include the steps of:
- locating an eye cup and welding ring in proximity to an ultrasonic horn;
- locating a base member in proximity to a holder positioned beneath the horn;
- applying by first and second rollers tension to a membrane positioned between the horn and holder; and
- melting, by emitting ultrasonic energy, an energy director on the welding ring to form the eyepiece.

The eyepiece can include a raised annular member extending outwardly from the eye cup and configured to contact a portion of the base member to inhibit liquid leakage at the interface.

The energy director can extend around a periphery of the welding ring to form a strong bond around the periphery of the interface between the welding ring and the base member.

The membrane can be in a continuous sheet and wherein the energy director is positioned to contact the membrane, whereby melting of the energy director causes separation of the membrane into separate parts.

The eyepiece can include a second raised annular member extending outwardly from the eye cup and configured to contact a different portion of the base member to inhibit further liquid leakage at the interface.

An interface between the base member and welding ring can be at least substantially free of adhesive and the liquid impermeable barrier is impermeable to selected biological microbes, the microbes being selected from the group consisting of bacterium, virus, and fungus.

The following definitions are used herein:

The phrases at least one, one or more, and and/or are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Acoustic impedance means the product of sound speed times density, pc, where p is the density (~993 kg/cu meter for water at 37 C) and c is the sound speed (1,520 meters per second at 37 C). Thus acoustic impedance of water at 37 C is about $1.509 \times 10^6$ kg/(sq meter-sec) or 1.509 Mrayls.

An acoustically reflective surface or interface is a surface or interface that has sufficient acoustic impedance difference across the interface to cause a measurable reflected acoustic signal. A specular surface is typically a very strong acoustically reflective surface.

Anterior means situated at the front part of a structure; anterior is the opposite of posterior.

An A-scan is a representation of a rectified, filtered reflected acoustic signal as a function of time, received by an ultrasonic transducer from acoustic pulses originally emitted by the ultrasonic transducer from a known fixed position relative to a body component.

Accuracy as used herein means substantially free from measurement error.

Aligning means positioning the acoustic transducer accurately and reproducibly in all three dimensions of space with respect to a feature of the body component of interest (such as the heart, liver, spleen and prostate, etcetera).

An arc scanner, as used herein, is an ultrasound eye scanning device where the ultrasound transducer moves back and forth along an arcuate guide track wherein the focal point of the ultrasound transducer is typically placed somewhere within the eye near the region of interest (i.e. the corneas, the lens etcetera). The scanner may also include a linear guide track which can move the arcuate guide track laterally such that the effective radius of curvature of the arcuate track is either increased or decreased. The scanner utilizes a transducer that both sends and receives pulses as it moves along 1) an arcuate guide track, which guide track has a center of curvature whose position can be moved to scan different curved surfaces; 2) a linear guide track;

and 3) a combination of linear and arcuate guide tracks which can create a range of centers of curvature whose position can be moved to scan different curved surfaces.

Body habitus is somewhat redundant since habitus by itself means "physique or body build." Body size and habitus describe the physical characteristics of an individual and include such considerations as physique, general bearing, and body build.

A B-scan is a processed representation of A-scan data by either or both of converting it from a time to a distance using acoustic velocities and by using grayscales, which correspond to A-scan amplitudes, to highlight the features along the A-scan time history trace (the latter also referred to as an A-scan vector).

A guide is an apparatus for directing the motion of another apparatus.

Hand-held ultrasonic scanner See Ultrasound Bio Microscopy (UBM).

HIFU means High-Intensity Focused Ultrasound.

The home position of the imaging ultrasound transducer is its position during the registration process.

An iatrogenic risk is a risk due to the activity of a physician or surgeon or by medical treatment or diagnostic procedures. For example, an iatrogenic illness is an illness that is caused by a medication or physician.

An imaging ultrasound transducer is the device that is responsible for creating the outgoing ultrasound pulse and detecting the reflected ultrasound signal that is used for creating the A-Scans and B-Scans.

A medical procedure is defined as non-invasive when no break in the skin is created and there is no contact with the mucosa, or skin break, or internal body cavity beyond a natural or artificial body orifice. Non-invasive procedures include specialized forms of surgery, such as radio surgery, extra corporeal shock wave lithotripsy (using an acoustic pulse for treatment of stones in the kidney, gallbladder or liver for example).

Positioner means the mechanism that positions a scan head relative to a selected part of an eye. In the present disclosure, the positioner can move back and forth along the x, y or z axes and rotate in the β direction about the z-axis. Normally the positioner does not move during a scan, only the scan head moves. In certain operations, such as measuring the thickness of a region, the positioner may move during a scan.

Position tracking sensors are a set of position sensors whose sole purpose is to monitor the movement of the eye or any other anatomical feature during the imaging scan so as to remove unwanted movement of the feature.

Posterior means situated at the back part of a structure; posterior is the opposite of anterior.

Precise as used herein means sharply defined and repeatable.

Precision means how close in value successive measurements fall when attempting to repeat the same measurement between two detectable features in the image field. In a normal distribution precision is characterized by the standard deviation of the set of repeated measurements. Precision is very similar to the definition of repeatability.

The pulse transit time across a region of the eye is the time it takes a sound pulse to traverse the region.

Refractive means anything pertaining to the focusing of light rays by the various components of the eye, principally the cornea and lens.

Scan head means the mechanism that comprises the ultrasound transducer, the transducer holder and carriage as well as any guide tracks that allow the transducer to be moved relative to the positioner. Guide tracks may be linear, arcuate or any other appropriate geometry. The guide tracks may be rigid or flexible. Normally, only the scan head is moved during a scan.

Sector scanner is an ultrasonic scanner that sweeps a sector like a radar. The swept area is pie-shaped with its central point typically located near the face of the ultrasound transducer.

A specular surface means a mirror-like surface that reflects either optical or acoustic waves. For example, an ultrasound beam emanating from a transducer will be reflected directly back to that transducer when the beam is aligned perpendicular to a specular surface.

Swept beam liquid interface ultrasound technology is an ultrasound technology wherein the transducer is moved in a prescribed path during scanning and wherein the ultrasound beam travels through a liquid medium from transducer face to the tissue being imaged. Swept beam liquid interface ultrasound technology is distinct from array based ultrasound technology.

A track or guide track is an apparatus along which another apparatus moves. In an ultrasound scanner or combined ultrasound and optical scanner, a guide track is an apparatus along which one or more ultrasound transducers and/or optical probes moves during a scan.

Ultrasonic or ultrasound means sound that is above the human ear's upper frequency limit. When used for imaging an object like the eye, the sound passes through a liquid medium, and its frequency is many orders of magnitude greater than can be detected by the human ear. For high-resolution acoustic imaging in the eye, the frequency is typically in the approximate range of about 5 to about 80 MHz.

Ultrasound Bio Microscopy (UBM) is an imaging technique using hand-held ultrasound device that can capture anterior segment images using a transducer to emit short acoustic pulses ranging from about 20 to about 80 MHz. This type of ultrasound scanner is also called a sector scanner. The UBM method is capable of making qualitative ultrasound images of the anterior segment of the eye but cannot unambiguously make accurate, precision, comprehensive, measurable images of the cornea, lens or other components of the eye.

A vector refers to a single acoustic pulse and its multiple reflections from various eye components. An A-scan is a representation of this data whose amplitude is typically rectified.

Water equivalent as used herein means a fluid or a gel having the approximate acoustic impedance of water.

BRIEF DESCRIPTION OF THE DRAWINGS

The present disclosure may take form in various components and arrangements of components, and in various steps and arrangements of steps. The drawings are only for purposes of illustrating the preferred embodiments and are not to be construed as limiting the disclosure. In the drawings, like reference numerals may refer to like or analogous components throughout the several views.

FIG. 20 is a top view of the eye piece base according to an embodiment of the present disclosure.

FIG. 21 is a bottom view of the eye piece base according to an embodiment of the present disclosure.

DETAILED DESCRIPTION OF THE DRAWINGS

In this disclosure, an apparatus and a method are described that are directed generally to ultrasound imaging of a human eye and particularly to the manufacture and assembly of an eye piece suitable for use with an ultrasonic arc scanning device.

In embodiments of the present disclosure, a scan head and ultrasound probe are immersed in water (scanner fluid or distilled water) and a membrane contained by the eye piece, which acts an eye seal, separates the scanner fluid (lower chamber) from the saline solution in the eye seal cup (upper chamber). The cornea of the eye is immersed in the saline solution and the eye is sealed against a soft, pliable and resilient material, such as a silicone thermo-plastic elastomer, that is a part of the eye piece assembly. Thus, the saline solution, the membrane and the scanner fluid form a continuous acoustic path that has substantially the same acoustic impedance as the anterior segment components of the eye. The acoustic path is also optically transparent and allows an optical camera to assist in centering the eye just prior to scanning.

Eye piece components of the eye piece of the present disclosure include a base fabricated from ABS plastic as an injection molded part; an eye piece membrane made from a thin water impermeable film; an eyecup fabricated from 50 durometer liquid silicone rubber; a welding ring also fabricated from ABS plastic as an injection molded part; and an eye piece membrane clamped between the base and eye cup by the plastic welding ring. The assembly is welded together by an ultrasound welding technique and a custom welding fixture. The membrane effectively defines first and second chambers, the upper chamber that is filled with saline in contract with the eye, and the lower chamber, full of distilled water, containing the ultrasound probe. A membrane applicator and tensioning fixture used to complete the assembly of the eye cup is also disclosed. A heated die may be brought down to cut the film with the same motion as the ultrasonic welding horn and the head is then raised to complete the assembly. The heated die may not be necessary as the ultrasonic welding may provide sufficient heat to cut the membrane as well. A ring of pressure sensitive adhesive is optionally applied to the opening in the base and the fixture then stretches film over the bottom of the base.

It is also possible to paint a bar or alphanumeric code on the membrane of the eye piece such that it can be read by the video camera when the video camera is in recording mode. This system would not significantly affect the transmission of acoustic energy during scanning.

Prior Art Ultrasound Eye Scanning Device

Figure 1:
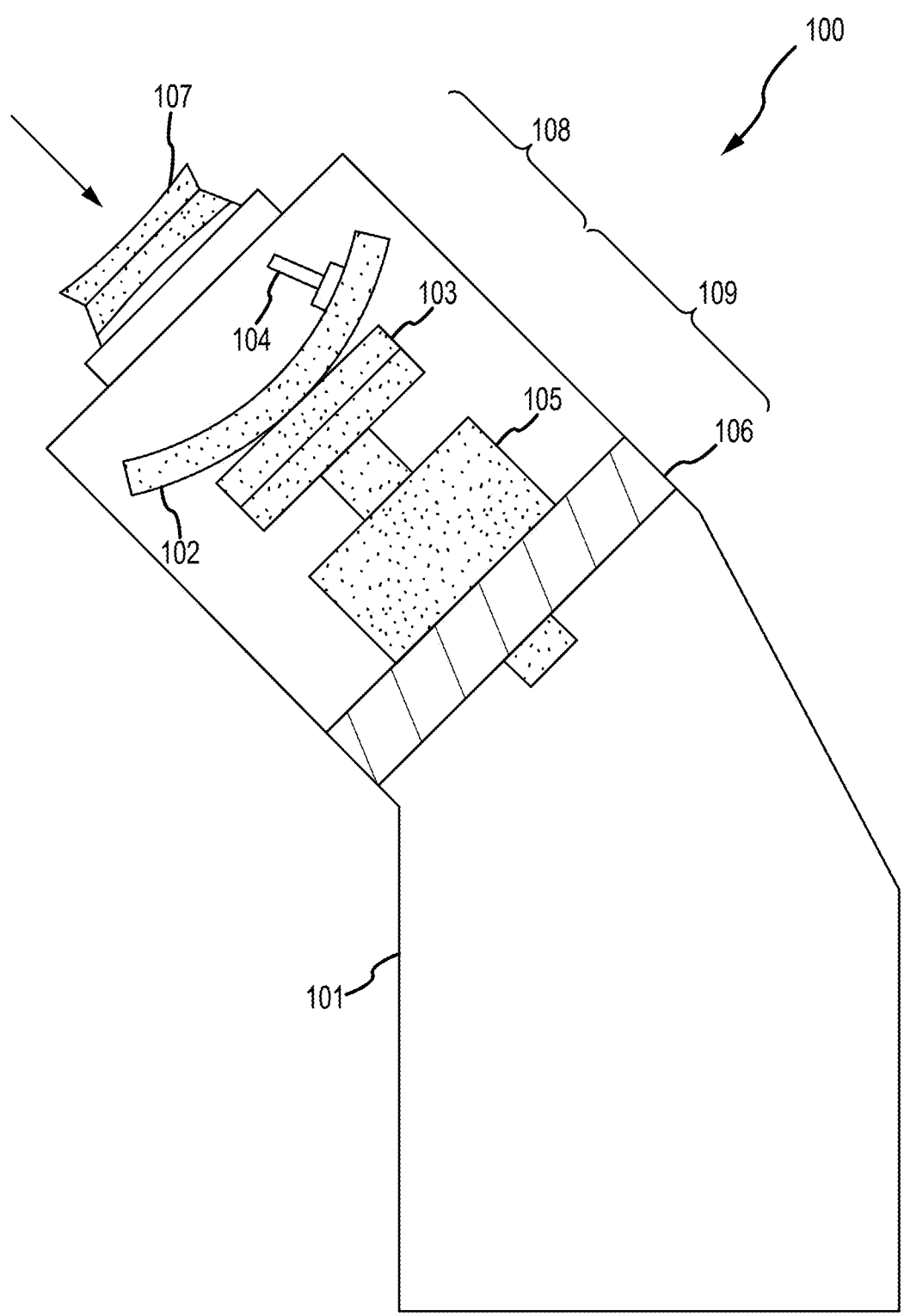
FIG. 1 is a schematic of the principal elements of a prior art ultrasound eye scanning device such as described in U.S. Pat. No. 8,510,883.

FIG. 1 is a schematic of the principal elements of a prior art ultrasound eye scanning device such as described in U.S. Pat. No. 8,510,883.

An ultrasound scanning apparatus, as described for example, in U.S. Pat. No. 8,317,709 is comprised of a positioning mechanism and a scan head. The positioning mechanism has x, y, z and beta (rotation about its z-axis) positioning mechanisms which make it possible to position the scan head relative to the eye component of interest. This operation is carried out while the patient's eye is positioned in contact with an eyepiece attached to the scanner and while the patient's head is fixed relative to the scanner by a head rest or by the eyepiece or by a combination of both. Once the positioning mechanism is set, the only moving part relative to the eye component of interest is the scan head. The scan head may be comprised of only an arcuate guide track which is typically used to produce an ultrasound scan of the cornea and/or much of the anterior segment of an eye. The scan head may be comprised of only a linear guide track. In another embodiment, the scan head may be comprised of an arcuate guide track and a linear guide track that can be moved in a combination of linear and arcuate motions to produce an ultrasound scan of the entire anterior segment including much of the posterior surface of the lens. The movement of the positioner and scan head relative to patient's eye socket is precisely known at all times by a system of magnetic encoder strips.

The movement of the scan head relative to the eye component of interest is therefore known with precision and accuracy as long as the patient does not move their eye during the scan. A single scan can take less than a second. A sequence of scans can take several seconds. A patient's eye can move significantly even during a single scan, thus degrading the precision and accuracy of the scan. The usual procedure, when this occurs, is to re-scan the patient. In US Publication No. 20130310692 entitled "Correcting for Unintended Motion for Ultrasonic Eye Scans", a device and method of tracking any movement of the patient's eye, relative to the positioning mechanism, during a scan is described.

Figure 4:
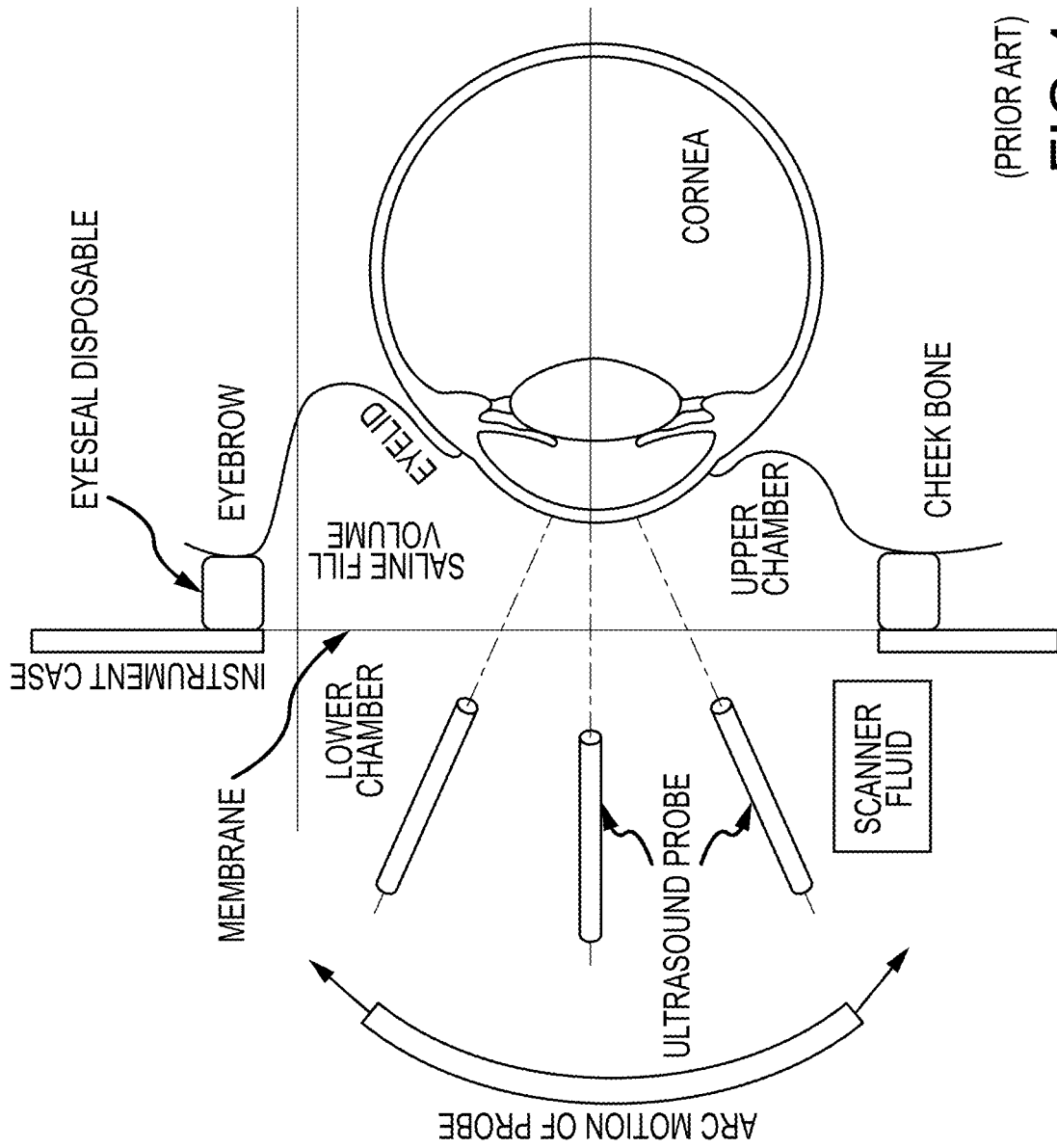
FIG. 4 is a schematic showing the relationship between the ultrasound transducer, the eye seal, and the patients eye according to an embodiment of the present disclosure.

The scanning apparatus 101 of this example is comprised of a scan head assembly 108 (shown here as an arcuate guide 102 with scanning transducer 104 on a transducer carriage which moves back and forth along the arcuate guide track, and a linear guide track 103 which moves the arcuate guide track back and forth as described in FIG. 4), a positioning mechanism 109 comprised of an x-y-z and beta mechanisms 105 mounted on a base 106 which is rigidly attached to scanning apparatus 101, and a disposable eyepiece 107. The scanning machine 101 is typically connected to a computer (not shown) which includes a processor module, a memory module, and a video monitor. The patient is seated at the machine 101 with their eye engaged with disposable eyepiece 107. The patient is typically looking downward during a scan sequence. The patient is fixed with respect to the scanning machine 101 by a headrest system and by the eyepiece 107. The operator using, for example, a mouse and/or a keyboard and video screen inputs information into the computer selecting the type of scan and scan configurations as well as the desired type of output analyses. The operator, for example, again using a mouse and/or a keyboard, a video camera located in the scanning machine and video screen, then centers a reference marker such as, for example, a set of cross hairs displayed on a video screen on the desired component of the patient's eye which is also displayed on video screen. This is done by setting one of the cross hairs as the prime meridian for scanning. These steps are carried out using the positioning mechanism which can move the scan head in the x, x, z and beta space (three translational motions plus rotation about the z-axis). Once this is accomplished, the operator instructs the computer using either a mouse and/or a keyboard to proceed with the scanning sequence. Now the computer processor takes over the procedure and issues instructions to the scan head 108 and the transducer 104 and receives positional and imaging data. The computer processor proceeds with a sequence of operations such as, for example: (1) with the transducer carriage substantially centered on the arcuate guide track, rough focusing of transducer 104 on a selected eye component; (2) accurately centering of the arcuate guide track with respect to the selected eye component; (3) accurately focusing transducer 104 on the selected feature of the selected eye component; (4) rotating the scan head through a substantial angle (including orthogonal) and repeating steps (1) through (3) on a second meridian; (5) rotating the scan head back to the prime meridian; (6) initiating a set of A-scans along each of the of selected scan meridians, storing this information in the memory module; (7) utilizing the processor, converting the A-scans for each meridian into a set of B-scans and then processing the B-scans to form an image associated with each meridian; (8) performing the selected analyses on the A-scans, B-scans and images associated with each or all of the meridians scanned; and (9) outputting the data in a preselected format to an output device such as storage disk drive or a printer. As can be appreciated, the patient's head must remain fixed with respect to the scanning machine 101 during the above operations when scanning is being carried out, which in a modern ultrasound scanning machine, can take several tens of seconds.

Figure 3:
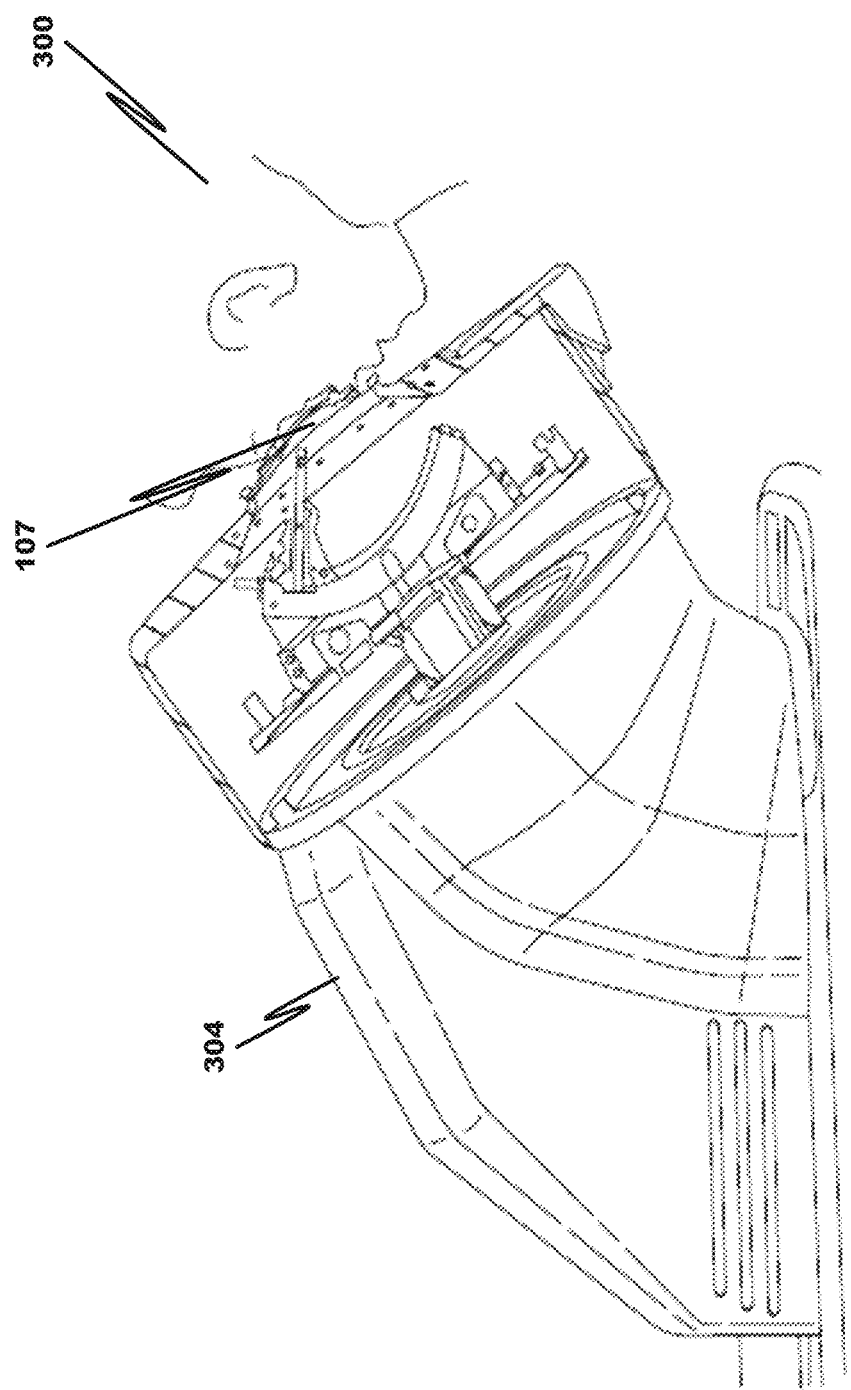
FIG. 3 is a rendering of an ultra sound scanner and patient being imaged according to an embodiment of the present disclosure.

An eyepiece 107 mounted to a mounting ring on an exterior housing of the scanning apparatus 101 serves to complete a continuous acoustic path for ultrasonic scanning, that path extending in water from the transducer to the surface of the patient's eye. The eyepiece 107 also separates the water in which the patient's eye is immersed from the water in the chamber in which the transducer guide track assemblies are contained. As shown in FIG. 3, the patient 300 sits at the machine 304 and looks down through the eyepiece 107. Finally, the eyepiece provides an additional steady rest for the patient and helps the patient to remain steady during a scan procedure.

As can be appreciated, the arcuate guide track used to image the eye has a radius of curvature similar to that of the cornea and anterior surface of the natural lens. If an arcuate guide track is used for imaging a prostate, for example, the radius of curvature can be appropriately adjusted by a combination of arcuate and linear motions such as described for example in U.S. Pat. No. 8,317,709. As can be further appreciated, the guide track can have another shape than arcuate or could, in principle, be made to flex in a precise way so as to custom fit a patient.

Prior Art Eyepiece

Figure 2:
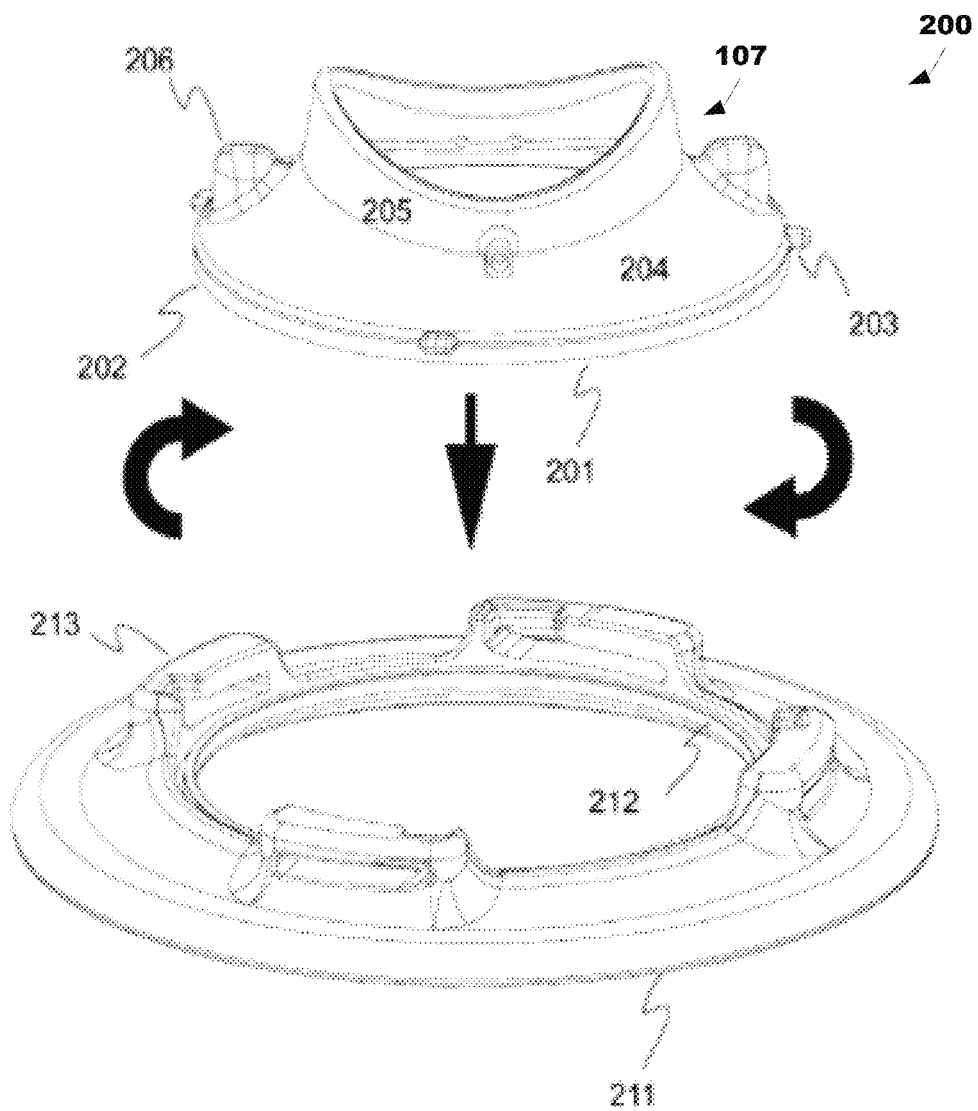
FIG. 2 is a side view illustrating a typical embodiment of a prior art eyepiece for an ultrasonic eye scanner.

With reference to FIG. 2, an eyepiece 107 serves to complete a continuous (substantially constant acoustic impedance) acoustic path for ultrasonic scanning, that path extending from the transducer to the surface of the patient's eye. The eyepiece 107 also separates the water in which the patient's eye is immersed from the water in the chamber in which the positioner and scan head assemblies are immersed. Finally, when the patient is in position for a scan with his or her head firmly against the eye piece, the eyepiece 107 provides a reference frame for the patient and helps the patient's head to remain steady during a scan. The eyepiece 107 also must be able to pass optical wavelengths of light so that fixation targets can be used to focus the patient's eye in a desired focal state and alignment with respect to the eye's visual or optical axis.

An eyepiece system 200 that satisfies these requirements typically comprises a mounting ring 211 and a detachable eye piece. The mounting ring 211 is attached to an exterior housing of the scanning machine 304 and is typically a permanent part of the main arc scanner assembly 100. The mounting ring 211 has several attachment grooves 213 which can accept attaching mechanisms 203 on the eye piece 107. The eye piece 107 is comprised of a base 204 and a soft rubber or foam contoured face seal or eye cup 205 which is designed to seal against a typical human face around the eye that is to be scanned.

Figure 13:
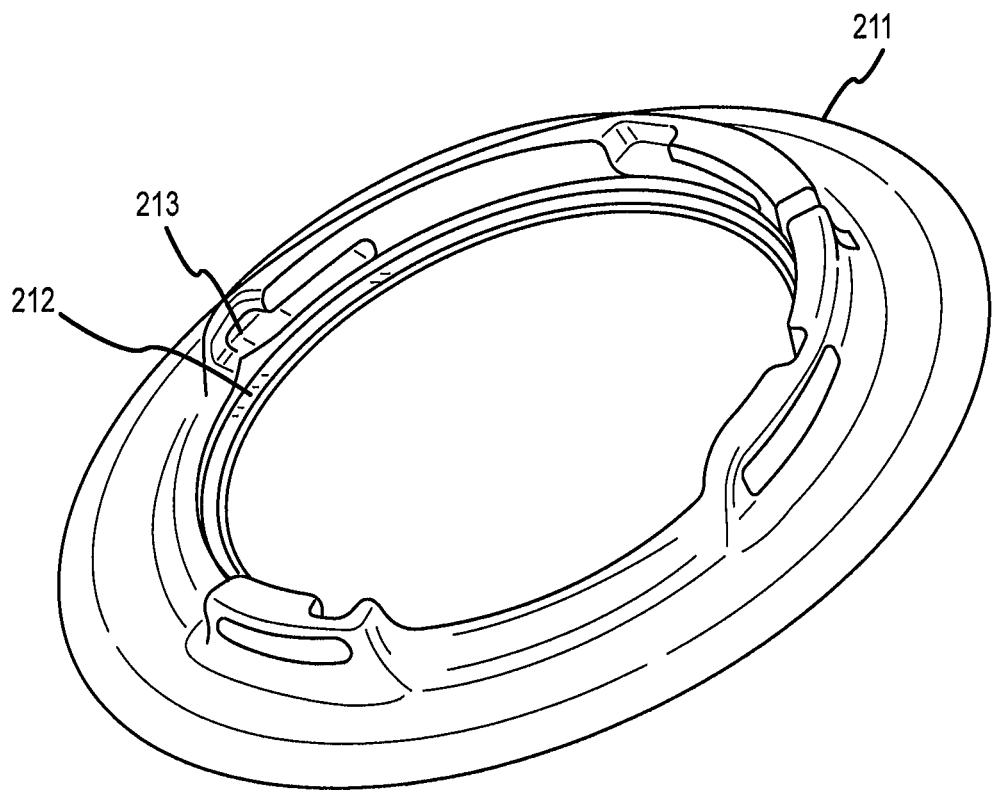
FIG. 13 is an isometric view of the eye seal holder according to an embodiment of the present disclosure.
Figure 10:
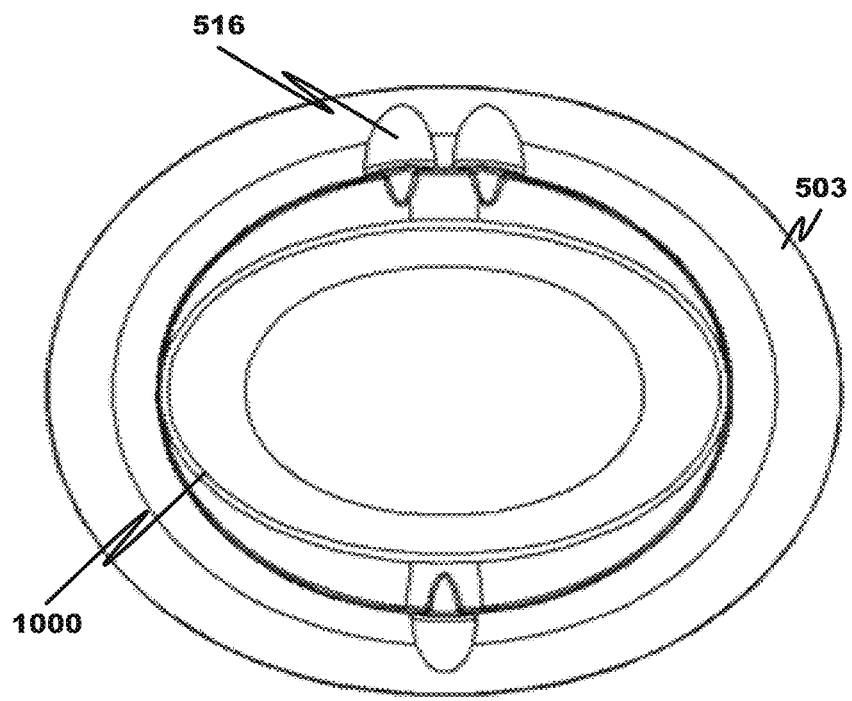
FIG. 10 is a plan view of the eye cup according to an embodiment of the present disclosure.
Figure 11:
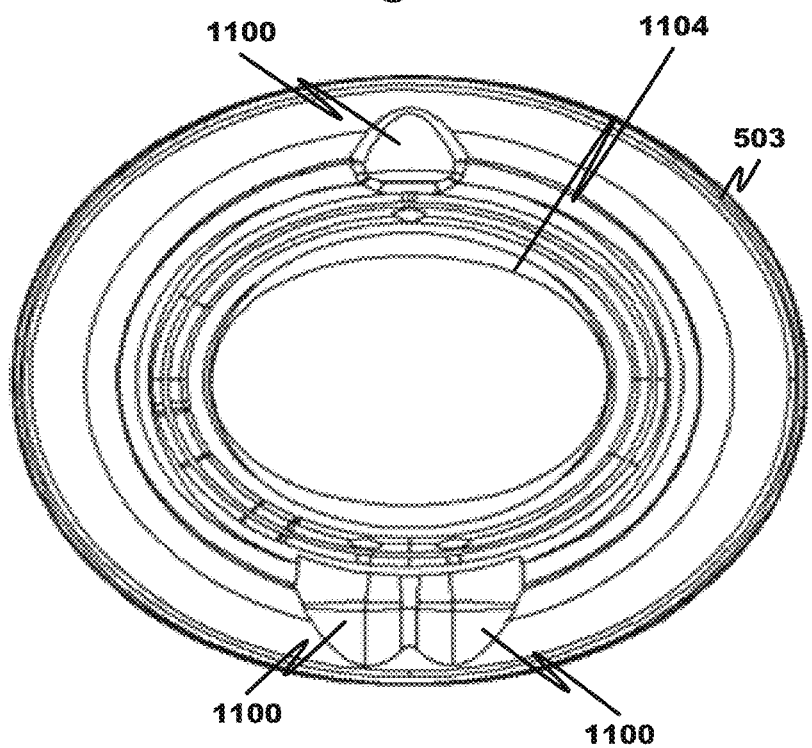
FIG. 11 is a bottom view of the eye cup according to an embodiment of the present disclosure.
Figure 12:
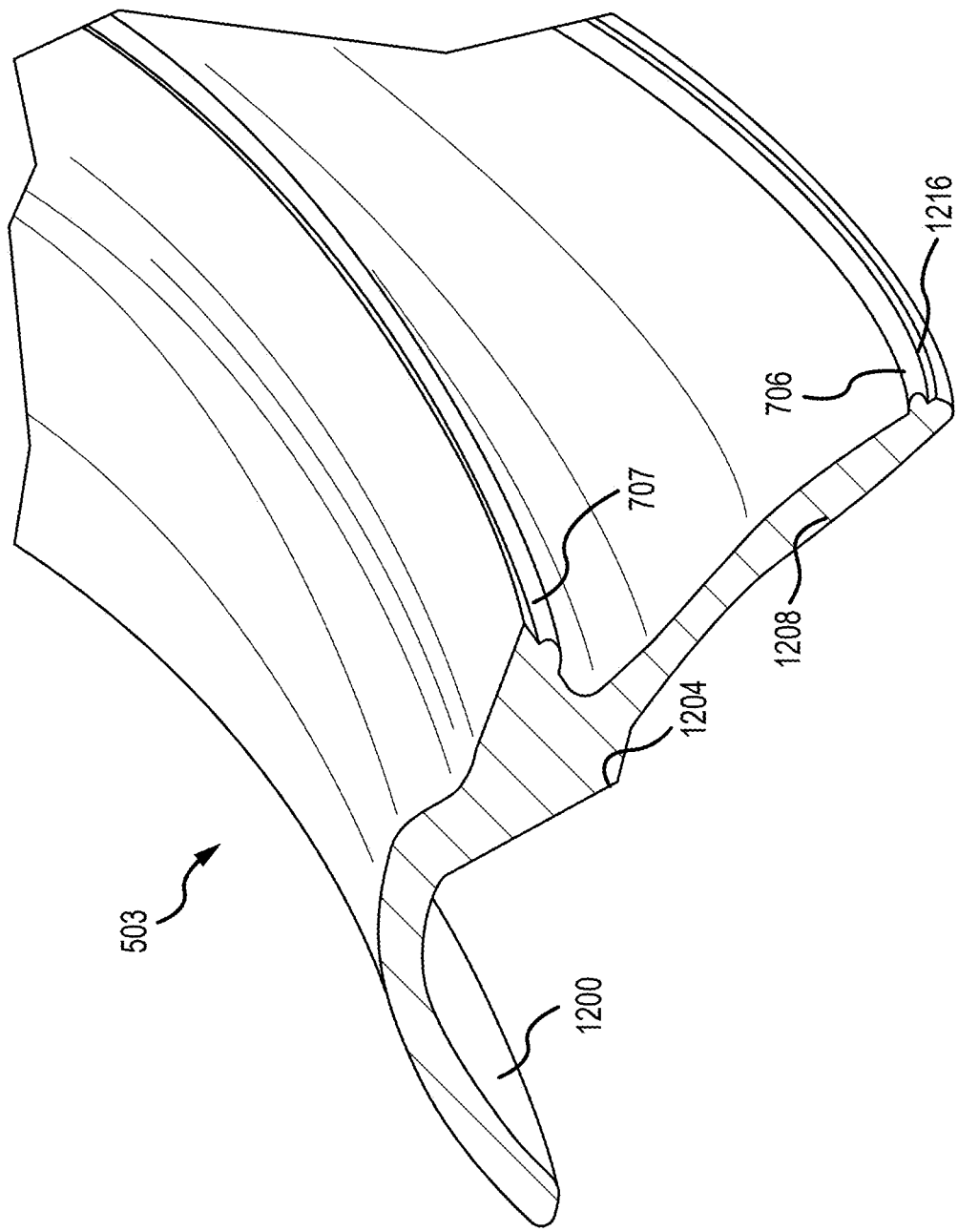
FIG. 12 is a cross section of the eye cup taken along a plane parallel to longitudinal axis of the eye cup according to an embodiment of the present disclosure.
Figure 14:
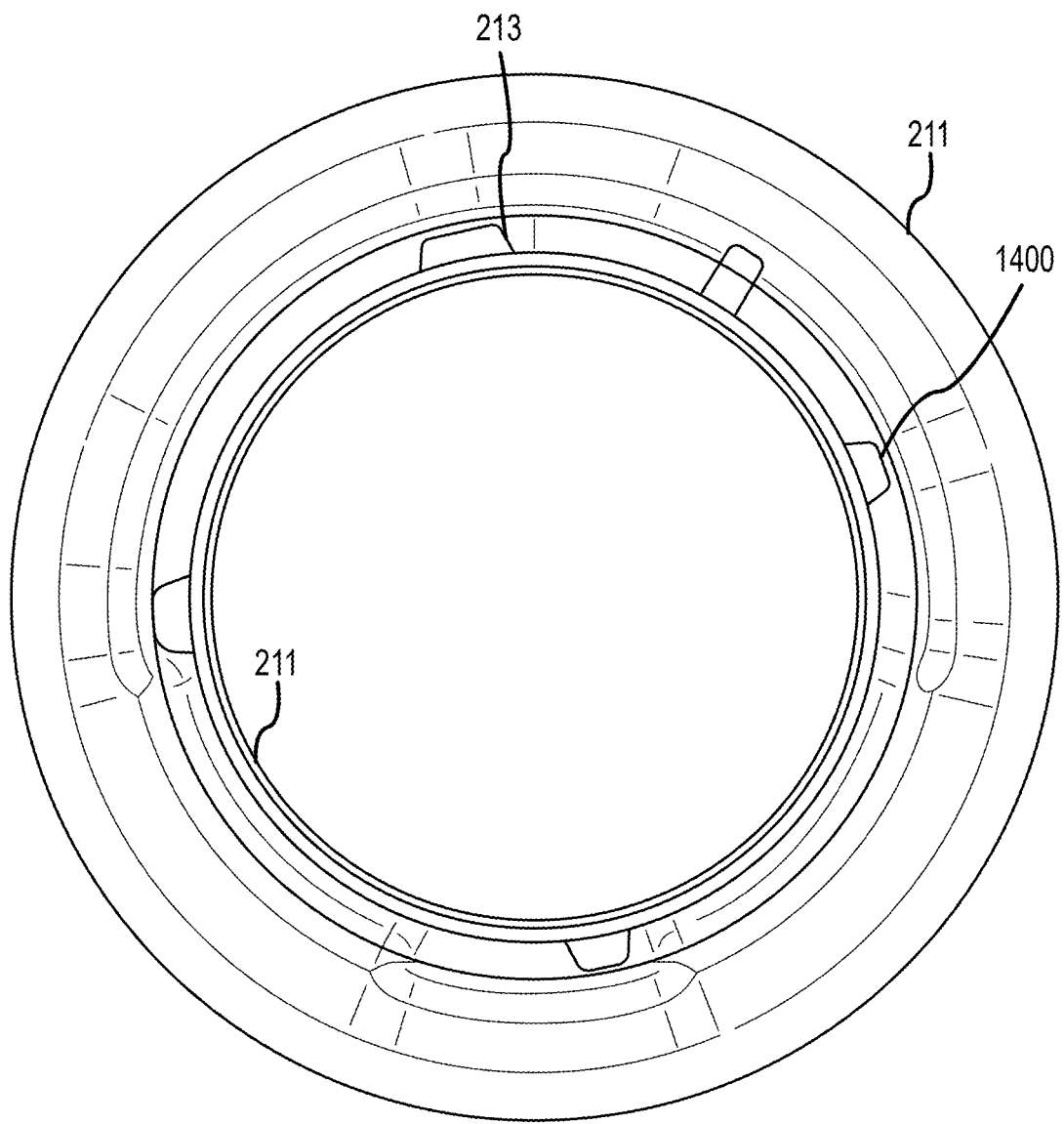
FIG. 14 is a plan view of the eye seal holder according to an embodiment of the present disclosure.
Figure 18:
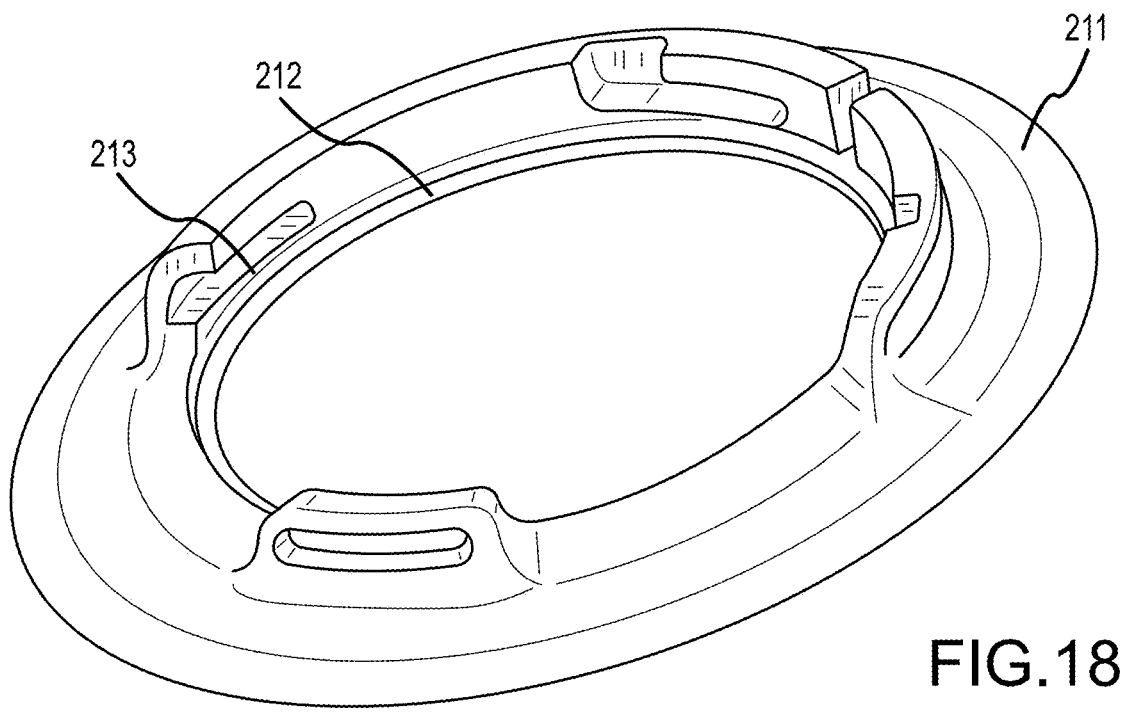
FIG. 18 is an isometric view of the eye seal holder according to an embodiment of the present disclosure.

With further reference to FIGS. 13, 14, and 18, the mounting ring 211 is attached to the main scanning machine housing and is typically a permanent part of the main scanner assembly. The mounting ring 211 may be fabricated from aluminum, steel, plastic or the like to be compatible with the material of the main scanner housing. As shown, the mounting ring 211 has several attachment grooves 213 which can, via interconnecting slots 1400 and grooves 213, accept the attaching mechanisms 203 on the eye piece base 204 such that the bottom surface 201 of the eye piece 107 forms a water-tight seal against the mounting ring 211. In this embodiment, the attaching mechanisms 203 are pushed down into the attachment grooves 213 and then rotated clockwise into position, using the thumb and finger protrusions 206, to form a mechanical connection that seals the eye piece base 204 against the mounting ring 211 to prevent water leakage. This is also known as a bayonet-type connection. There is an additional sealing feature including a groove 202 molded as part of the eye piece base 204 and a matching tongue 212 formed as part of the mounting ring 211. When the eye piece 107 is rotated into position with the mounting ring 211, the tongue and groove form a contact connection which compresses as the parts are rotated into position. Since the eye piece base 204 is typically made from a deformable plastic, the compliance of the plastic further helps in forming a watertight seal. The eye piece 107 has a soft rubber or foam face seal 205 which is designed to seal against a typical human face around the eye that is to be scanned.

A sealed hygienic barrier (not shown) is formed as part of the eye piece 107 and is typically located where the soft rubber or foam face seal 205 is connected to the eye piece base 204 of eye piece 107.

As described previously, the eye piece typically includes a soft rubber or foam contoured face seal 205 which is designed to seal against a typical human face around the eye that is to be scanned. The contoured face seal 205 may also be made from a foam material impregnated with, for example, mineral oil, to provide a superior sealing action against a typical human face around the eye. This eye piece is more completely described U.S. Pat. No. 8,758,252.

A Radio Frequency ("RF") Identification ("ID") chip can be molded, preferably into the plastic base of the eye piece or, alternately into the conformable face seal of the eye piece. This RF ID chip can communicate with an RF pick-up device located on or inside the machine body. The RF ID chip can transfer information to the RF pick-up device to identify the specific patient associated with the eye piece and to record, for example, how many scans the patient has had using that eye seal and the date on which the scans were made.

Alternately, patient and eye piece information can be recorded on a bar or alphanumeric code imprinted on the base of the eye piece. A bar or alphanumeric code reader can be included as part of the scanning machine and, when read by the scanning machine, the information can be recorded in a database in the computer that is part of the scanning machine.

Referring again to FIG. 3, the bucket or compartment which holds the positioner and scan head assemblies and the water used during scanning, is shown in a cutaway view. This cutaway view also shows the ultrasound transducer with the probe tip very close to one side of the eye seal membrane and with the patient's eye on the other side of the membrane.

FIG. 4 is a schematic showing the relationship between the ultrasound transducer or probe, the eye seal or eye cup and the patient's eye. In this figure, an ultrasound transducer (also known as an ultrasound probe) is shown in three consecutive positions as it moves along an arcuate guide track. The dot-dash lines represent the ultrasound beam paths. As noted previously, the scan head and probe are immersed in water (scanner fluid) and a membrane contained by the eye piece or eye seal separates the scanner fluid (lower chamber) from the saline solution in the eye seal cup (upper chamber). The cornea of the eye is immersed in the saline solution and the eye is sealed against a soft material, such as a silicone thermo-plastic elastomer, that is part of the eye piece assembly. Thus the saline solution, the membrane and the scanner fluid form an acoustic path that has substantially the same acoustic impedance as the anterior segment components of the eye. The acoustic path is also optically transparent and allows an optical camera to assist in centering the eye just prior to scanning.

Present Disclosure

Figure 5:
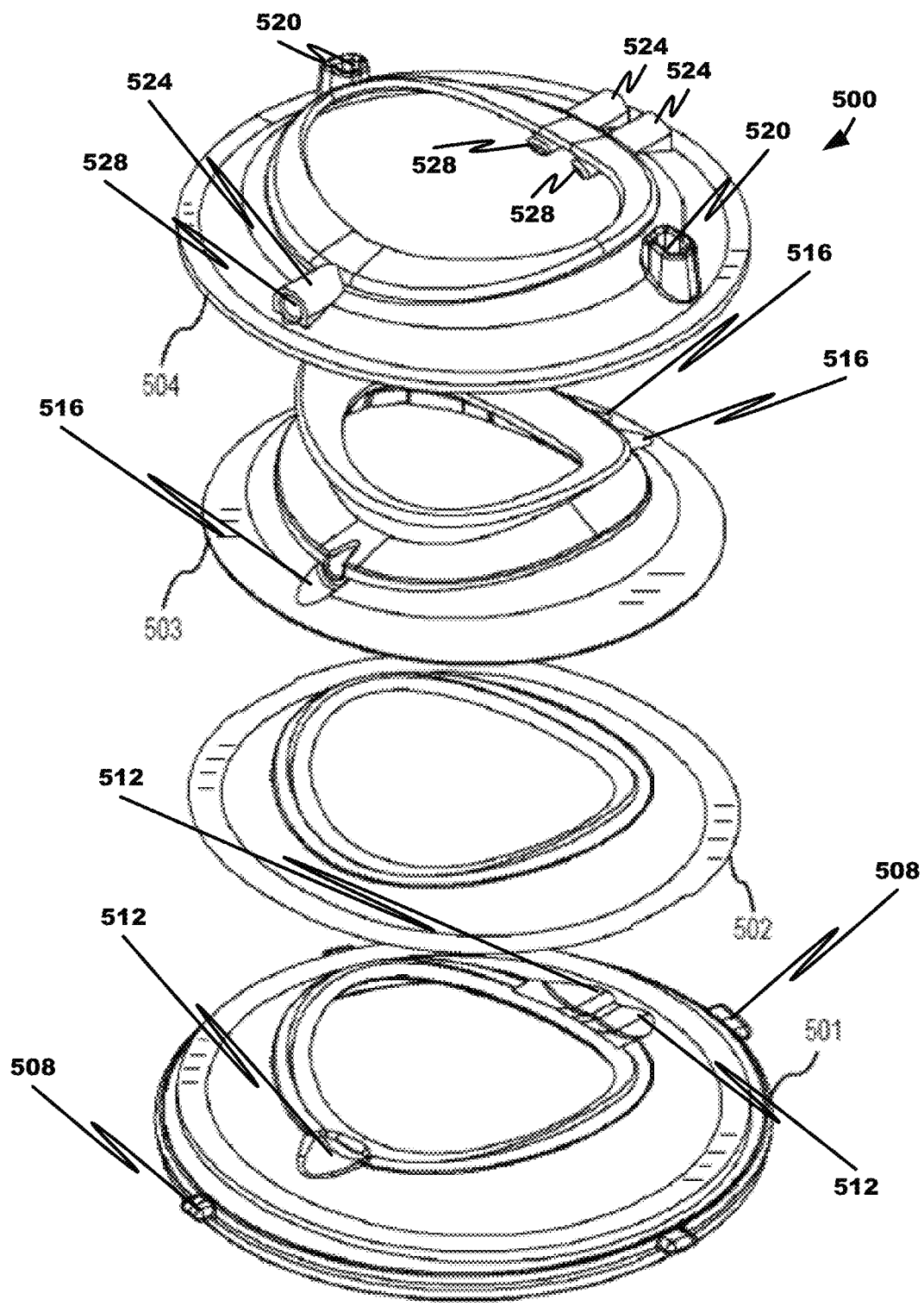
FIG. 5 is a disassembled view of eye piece components used to assemble the eye piece according to an embodiment of the present disclosure.

FIG. 5 is a disassembled view showing a sequence of eye piece components used to assemble the eye piece 500 of the present disclosure. With reference to FIGS. 5 and 20-21, the base 501 is fabricated from a hard plastic such as ABS as an injection molded part and comprises attachment mechanisms 508 and drain, fill, and vent port indentations 512. The water impermeable eye piece membrane 502 is made from a thin acoustically and optically transparent film. and is formed from a roll during the welding. Eyecup 503 is fabricated from soft pliable material such as 50 durometer liquid silicone rubber and comprises drain, fill and port channels 516 complementary to and received in corresponding ones of the drain, fill, and vent port indentations 512. Welding ring 504 is also fabricated from a hard plastic such as ABS as an injection molded part. The materials for the base and welding ring are chosen such that they are suitable for ultrasonic welding.

Figure 15:
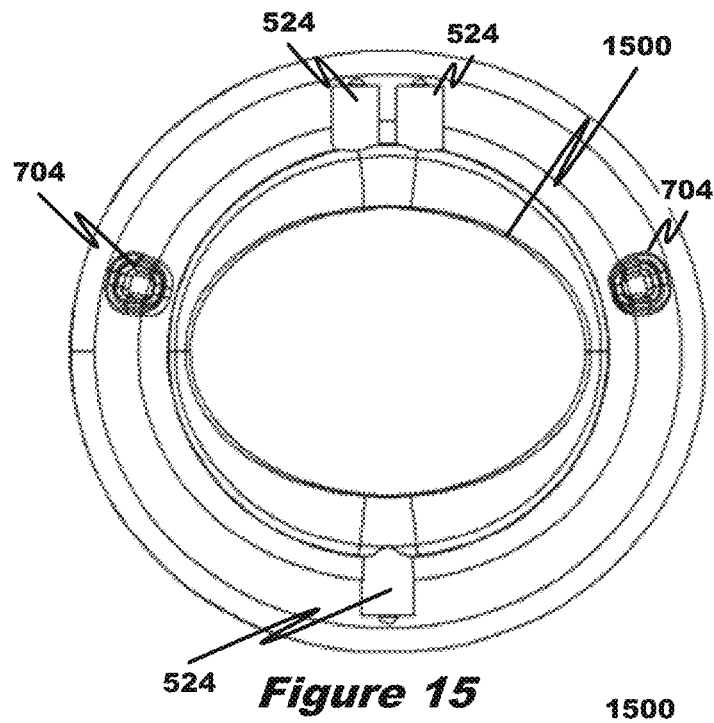
FIG. 15 is a top view of a welding ring according to an embodiment of the present disclosure.
Figure 16:
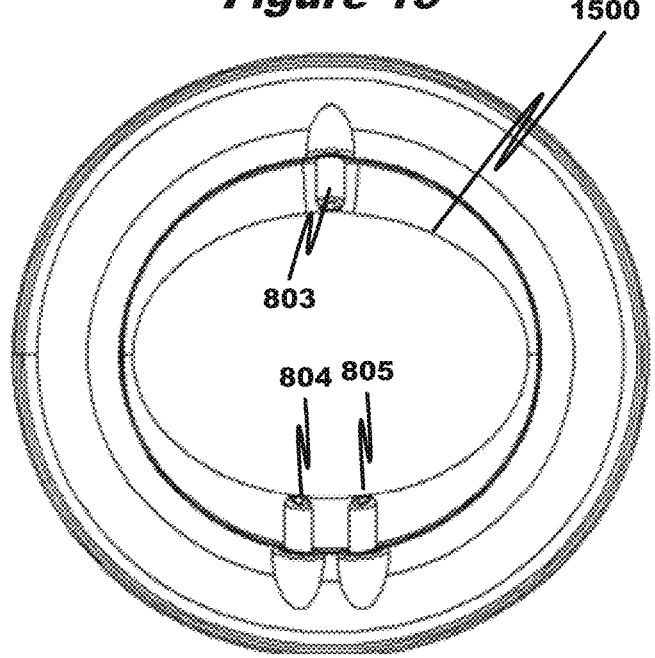
FIG. 16 is a bottom view of the welding ring according to an embodiment of the present disclosure.
Figure 17:
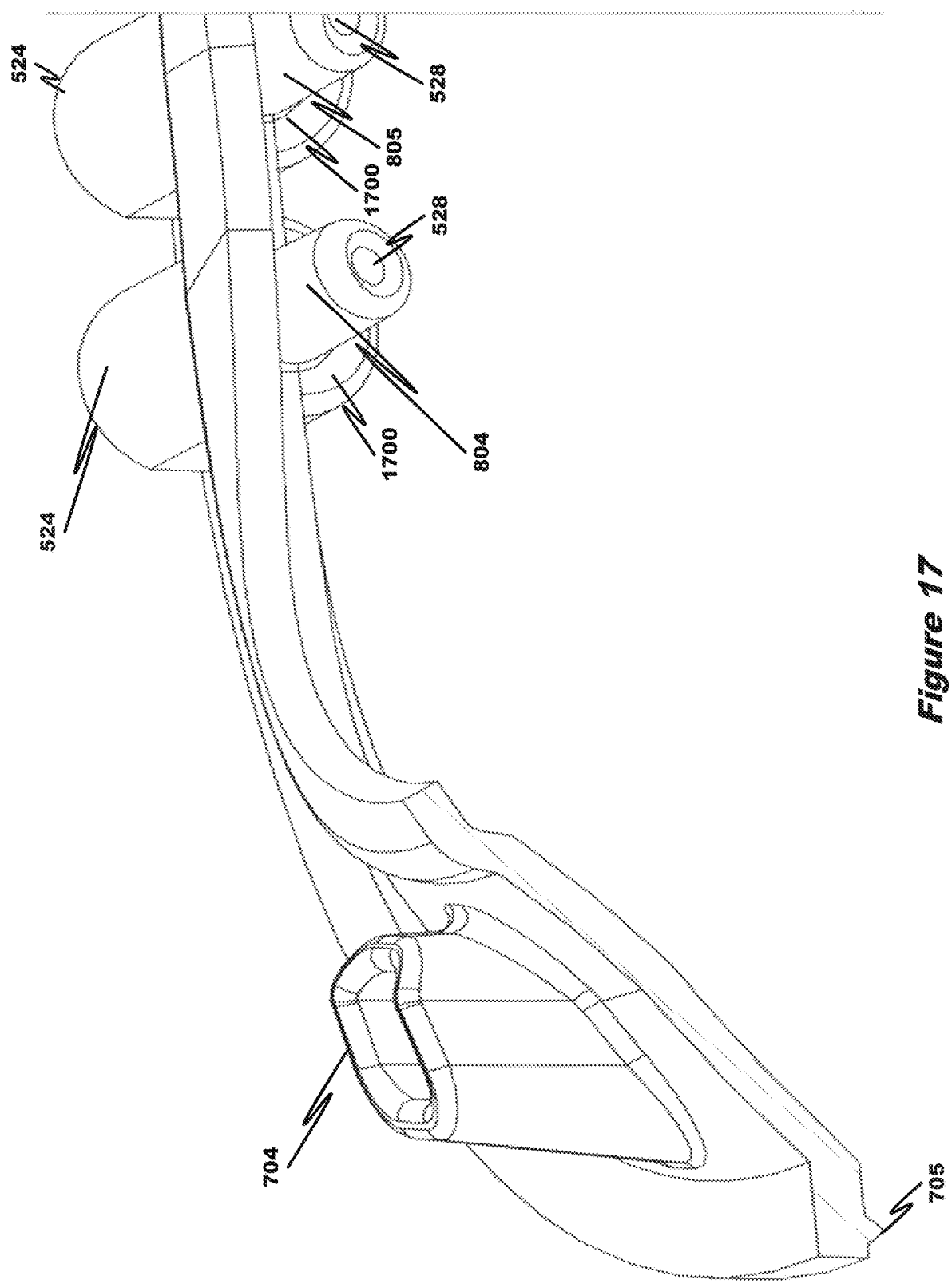
FIG. 17 is a cross-sectional view of the welding ring taken along a plane parallel to longitudinal axis of the eye cup according to an embodiment of the present disclosure.

With reference to FIGS. 5, 15, and 16, the welding ring 504 comprises the thumb and finger protrusions 520 and drain, fill and ports 524 that are received in respective ones of the drain, fill and port channels 516. As will be appreciated, each of the drain, fill, and port channels 516 comprises a central passage 528 that passes completely through the welding ring to provide fluid communication between the interior and exterior either side of the central passage. The central opening 1500 has the same shape as the annular base of the eye seal collar 720 of the eye cup 503.

Figure 19:
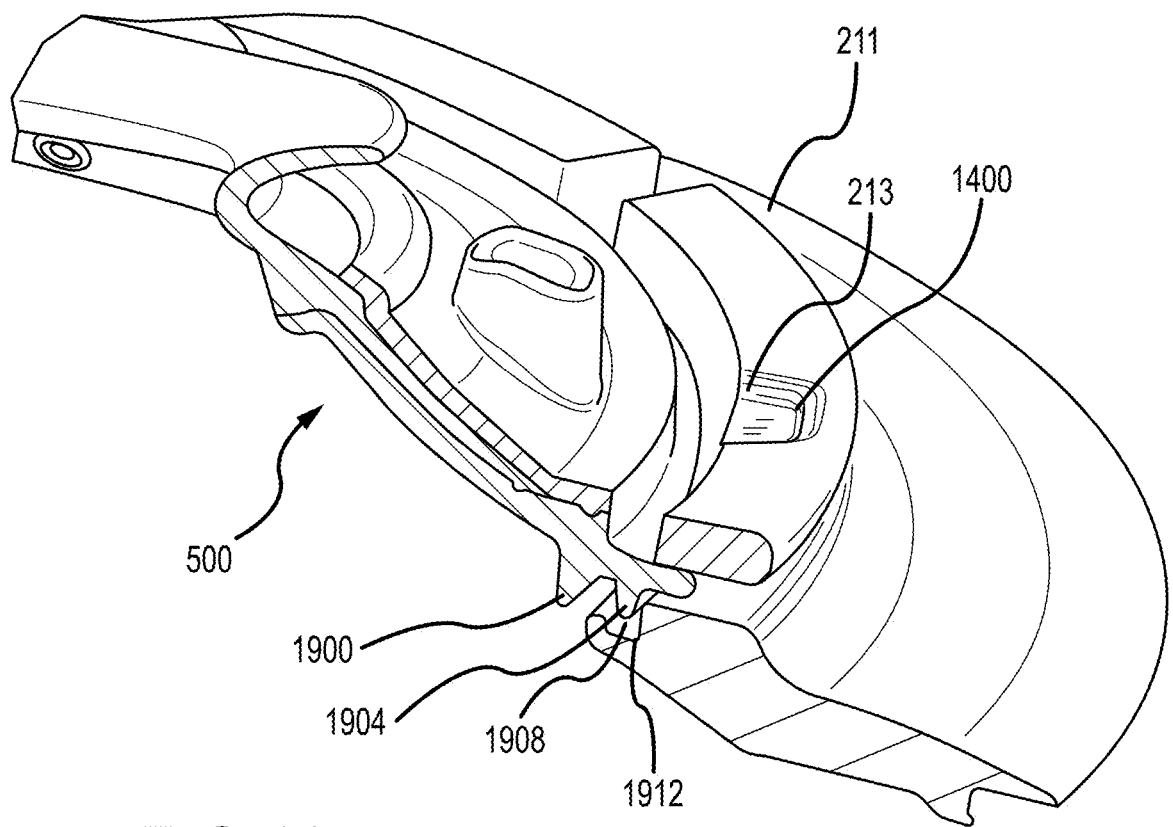
FIG. 19 is a cross-sectional view n assembled view taken along a plane parallel to longitudinal axis of the eye piece according to an embodiment of the present disclosure.

FIG. 19 shows the engagement of the eye piece 500 to the mounting ring 211. The attachment mechanisms 508 are received by the slots 1400 and directed to the grooves 213, and the eye piece rotated into position. The eye piece 500 comprises opposing arms 1900 and 1904 with arm 1904 engaging a resilient O-ring 1908 positioned in channel 1912 in the mounting ring to form a water-tight seal therebetween.

The eye piece 500 forms a fluid enclosure around the eye thus forming a continuous fluid path between the eye and the ultrasound transducer which is immersed in fluid within the body of the ultrasound scanner (see FIG. 1). The first or upper chamber is between the first (upper) side of the membrane 502 and the patient's eye. The second or lower chamber is between the second (lower) side of the membrane 502 and the distilled water in the scanning machine. As can be seen from FIG. 5, the mutually engaging upper and lower surfaces of each of the welding ring 504, eye cup 503, membrane 502 and base 501 are shape matched to avoid water leakage. Additionally, the shapes of each of the central openings of each of the welding ring (central opening 1500), eye cup (central opening 1104), and base (central opening 2100) are substantially the same and substantially the same area to reduce ultrasound imaging noise from reflections from the eye piece.

Figure 6:
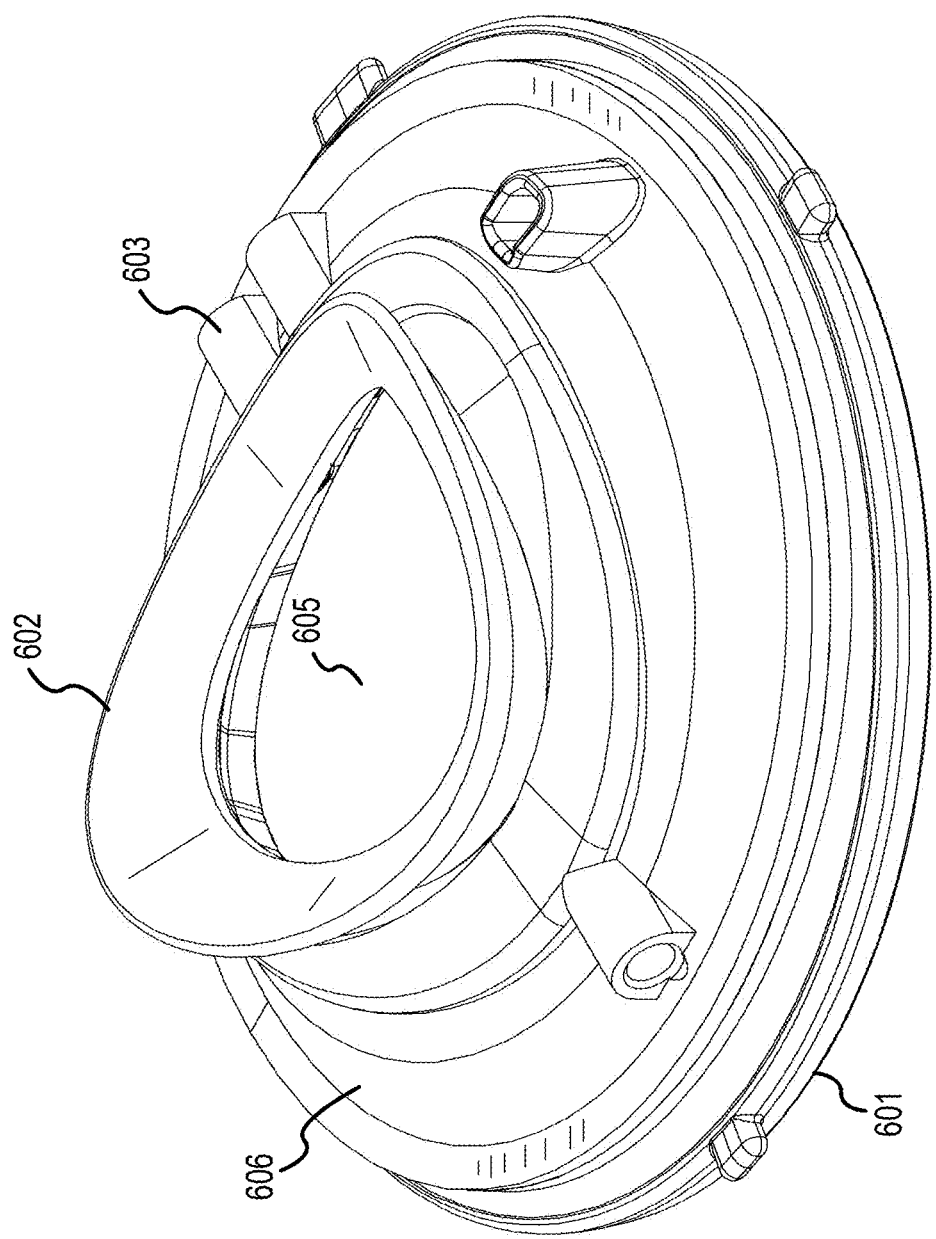
FIG. 6 is a schematic view of the assembled eye piece according to an embodiment of the present disclosure.

FIG. 6 is a schematic of the assembled eye piece of the present disclosure. Membrane 605 is clamped between base 601 and eye cup 602 by welding ring 606. This assembly is welded together by an ultrasound welding technique and welding fixture as described in FIGS. 22-24. Membrane 605 effectively forms 2 chambers, the upper chamber that is filled with saline in contract with the eye, and the lower chamber, full of distilled water, containing the ultrasound probe. Saline fill, drain and vent tubes 603 are also shown. In some embodiments, each of the interfaces between the base 601 and membrane 605/welding ring 606, membrane 605 and eye cup 602/welding ring 606, and the eye cup 602 and welding ring 606 are substantially free of an adhesive because melted plastic from sonic welding provides sufficient bonding force to hold the various components together.

Figure 7:
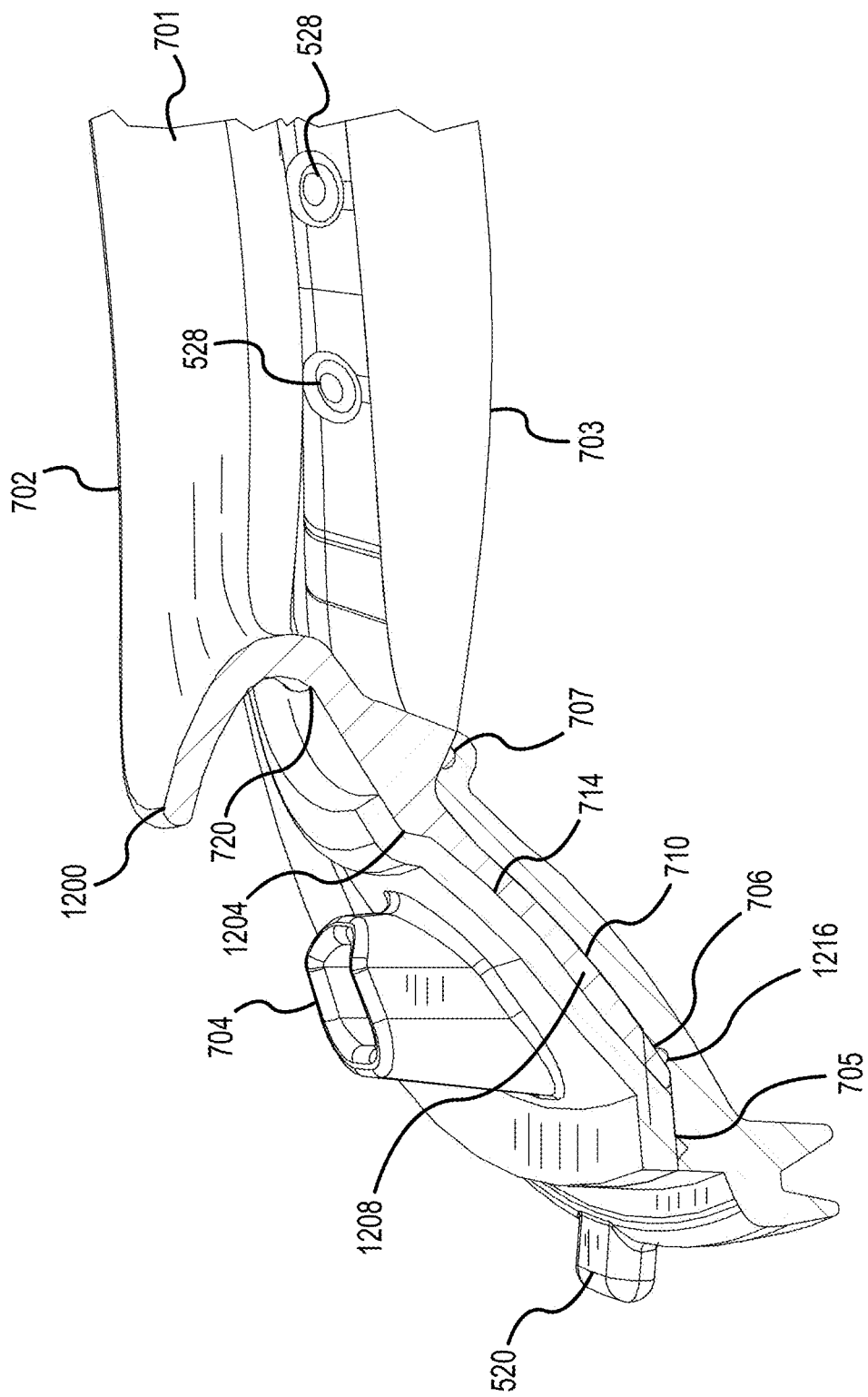
FIG. 7 is a cross section taken along a plane parallel to longitudinal axis of the assembled eye piece according to an embodiment of the present disclosure.

FIG. 7 is a schematic cross section of the assembled eye piece of the present disclosure demonstrating the features to prevent leakage between the two chambers. Welding ring 702 clamps eye cup 701 and membrane (film) 703 to base 704. Annular "Energy Director" 705 on and extending around the periphery of the welding ring 702 is welded to the base 704, shaping the cutting of the thin film membrane 703 and compressing eye cup 701 to isolate and seal the chambers. Furthermore, the eyecup 701 has two annular raised features 706 and 707 which extend around the inner periphery of the eye cup 701 and effectively form O-rings to further prevent the leakage of the distilled water from the lower chamber into the upper chamber via the interface 710 between the eye cup and the base 704. Positioning of the water impermeable eye cup 702 between the welding ring and base prevents water from leaking via the interface 714 between the eye cup and welding ring.

With further reference to FIGS. 7, 12, and 25A-B, the eye cup 503, 602, and 701 comprises an outwardly extending eye seal collar 1200 to engage the patient's eye socket, a shoulder 1204 to engage the welding ring 504, 606, and 702 and an elongated tongue 1208 that is received between the welding ring and base 501. An annular channel 1216 permits the annular raised feature 706 to deform in response to pressure applied to the welding ring and base during welding to form a water-right seal. As can be seen from the figures, water in a first chamber above the membrane contacts the eye of the patient and can leak only through the interface 710 between the eye cup and the base member, which, in the event of leakage, directs the water away from the water in a second chamber located below the membrane. The second chamber is in fluid communication with the water inside the scanning machine. The configuration thereby avoids contamination of the water in the second chamber with patient-contaminated water in the first chamber.

Figure 8:
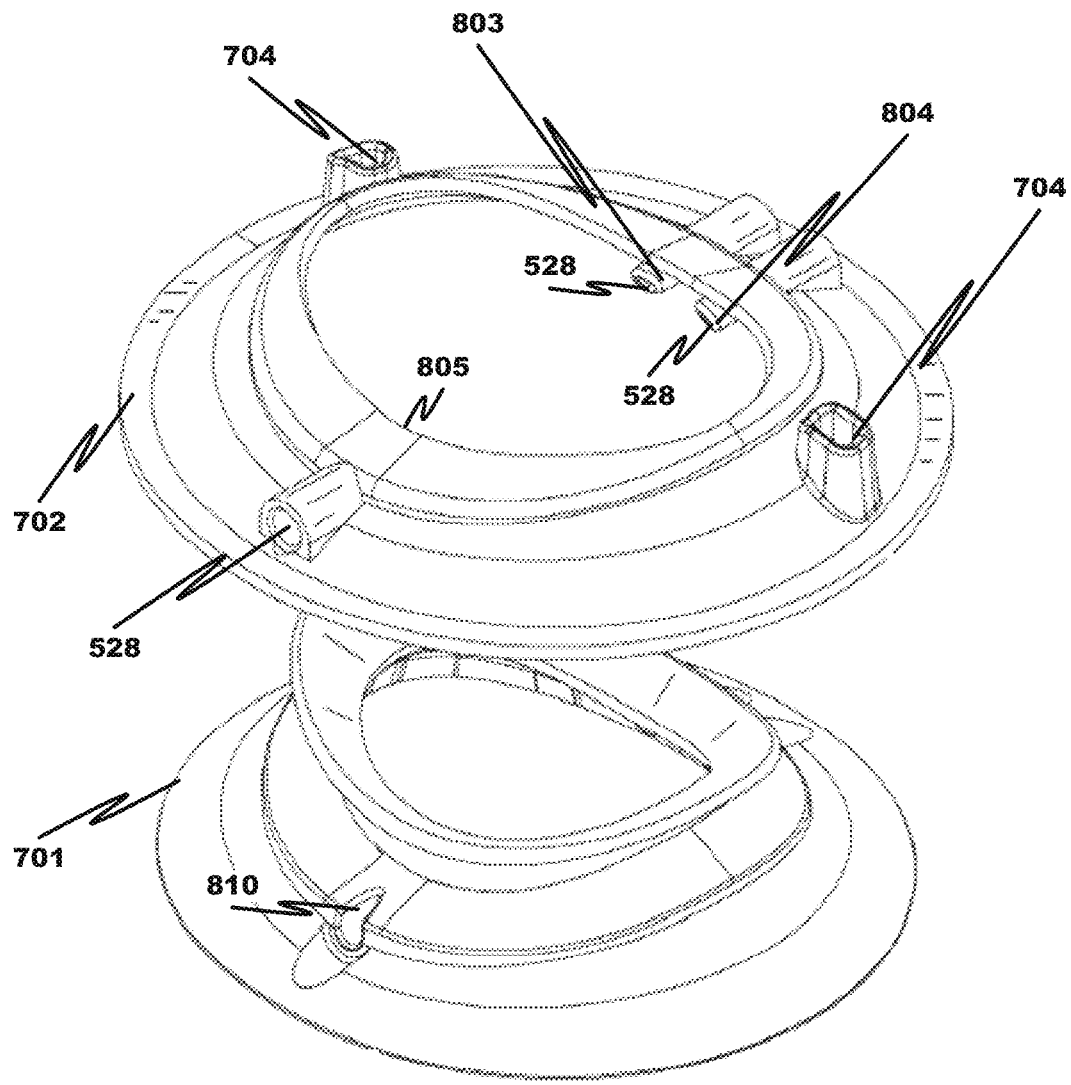
FIG. 8 is a disassembled view illustrating the eyecup to be assembled to the welding ring according to an embodiment of the present disclosure.
Figure 9:
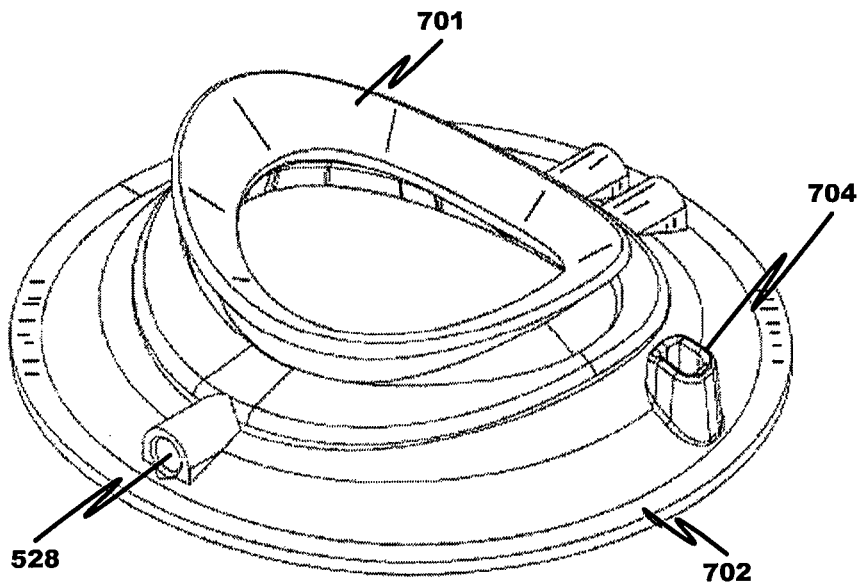
FIG. 9 is an isometric view of the eye piece showing the eye cup according to an embodiment of the present disclosure assembled with the welding ring prior to ultrasonic welding.

FIG. 8 illustrates the eyecup to be assembled to the welding ring. With respect to FIGS. 8, 10, 11-12 and 17, note the interiorly extending bosses 803, 804, and 805 on the welding ring which will be received by and protrude through corresponding ones of 'the openings 810 and 1100 in the eyecup 503, 602, and 701 so as to provide a clear path for the saline via the drain, vent and fill ports. Each of the bosses terminates in a chamfered flat surface 1700 that engages the eye cup and maintains the eye cup in a desired position. FIG. 8 illustrates the eyecup 503, 602, and 701 and welding ring 504, 606, and 702 prior to assembly. The eye seal 1000 is received in the central opening of the welding ring and protrudes through and above the welding ring.

Figure 22:
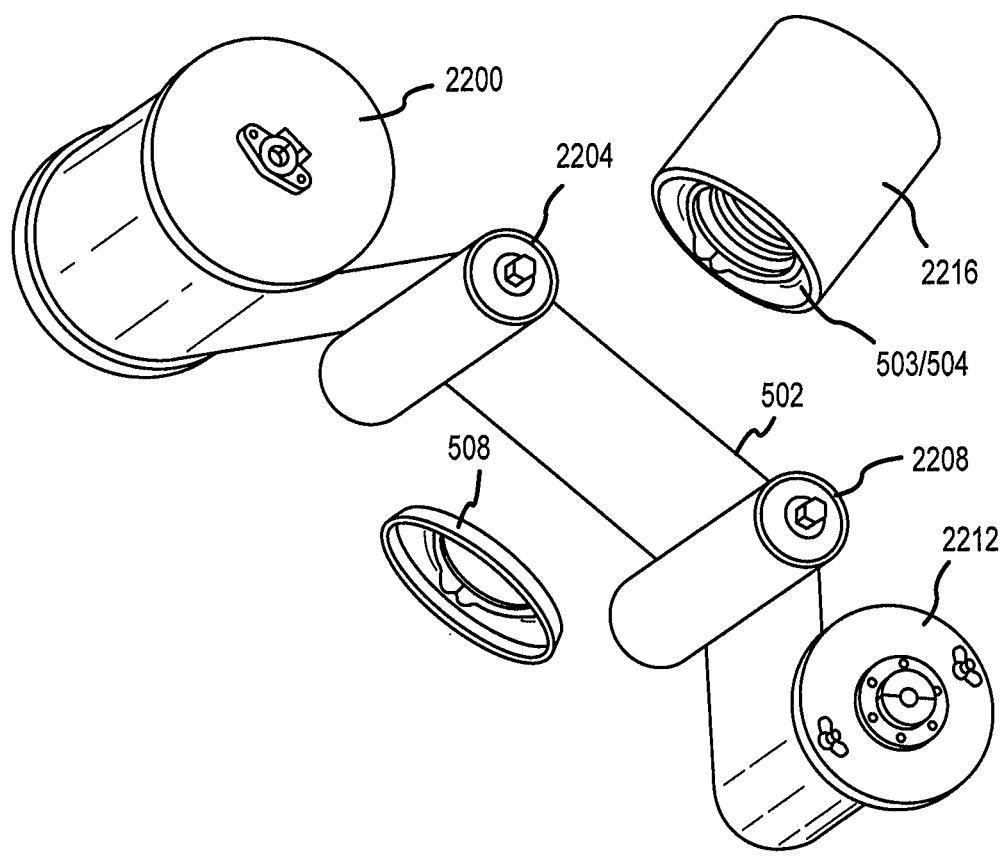
FIG. 22 is an isometric view of the bottom of a sonic weld assembly prior to welding according to an embodiment.
Figure 23:
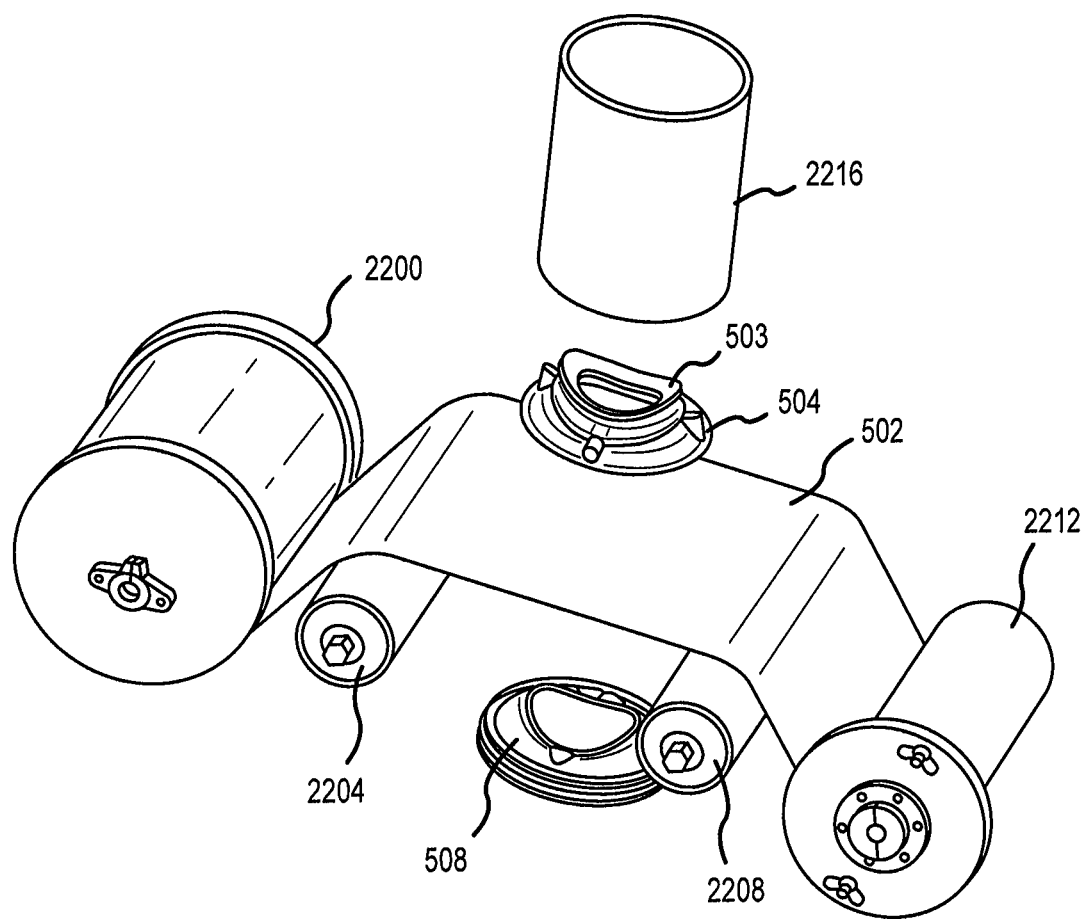
FIG. 23 is an isometric view of the top of the sonic weld assembly prior to welding according to an embodiment.

FIGS. 22-23 show the eye cup 503 and welding ring 504 of the present disclosure assembled with the welding ring prior to ultrasonic welding. Base 508 is placed in a fixture or holder (not shown) and the membrane or film 502 is stretched by opposing rollers 2200, 2204, 2208 and 2212 over base 508 prior to placing eye cup 503 and welding ring 504 in position in the ultrasonic welder horn 2216 for ultrasonic welding. As discussed below, the cup-ring assembly is placed into an ultrasonic welder horn. The horn is counterbored, with some of the fixture on the inside to position the eye cup and other features as a "spring holder". The sides of the eyecup, along with other features on the welding ring, are used to hold the assembly in the horn.

Figure 24:
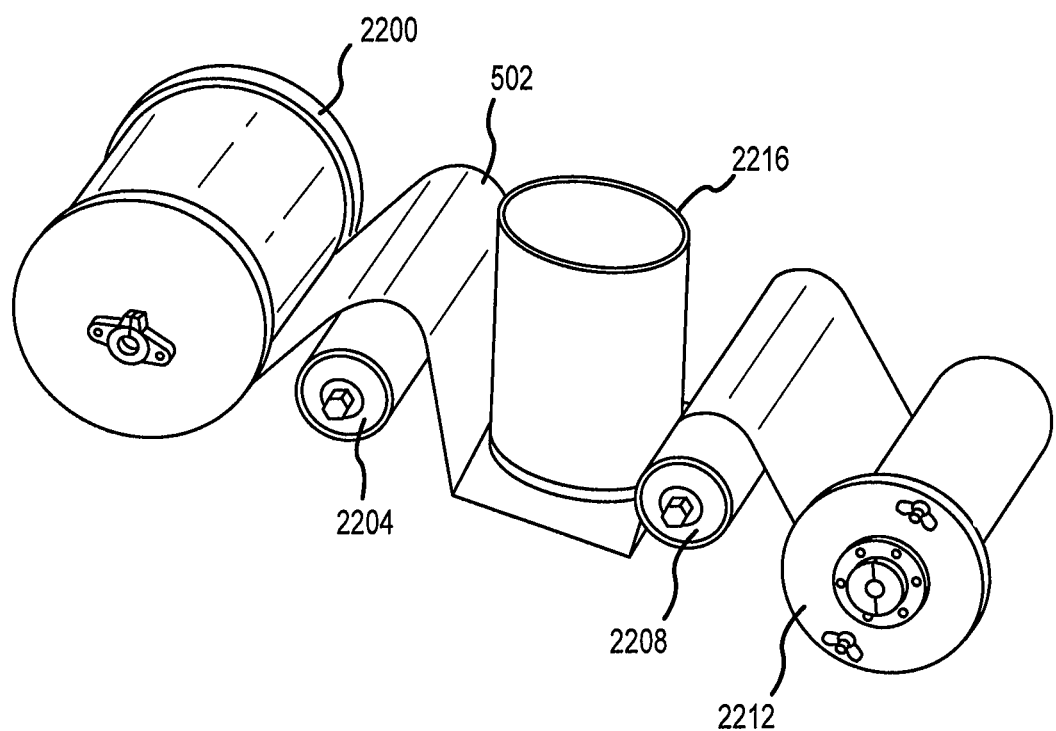
FIG. 24 an isometric view of the top of the sonic weld assembly during welding according to an embodiment.
Figure 25B:
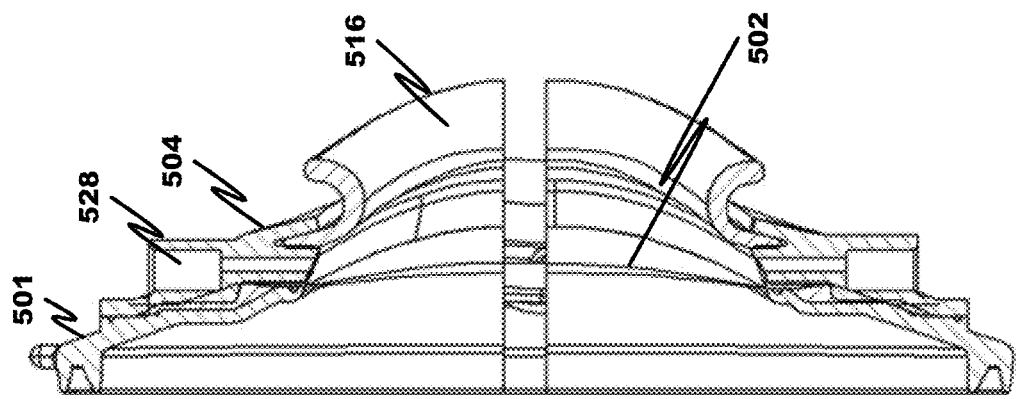
FIG. 25B is a cross-sectional view of the eye piece taken along sectional line A-A of FIG. 25A.
Figure 25A:
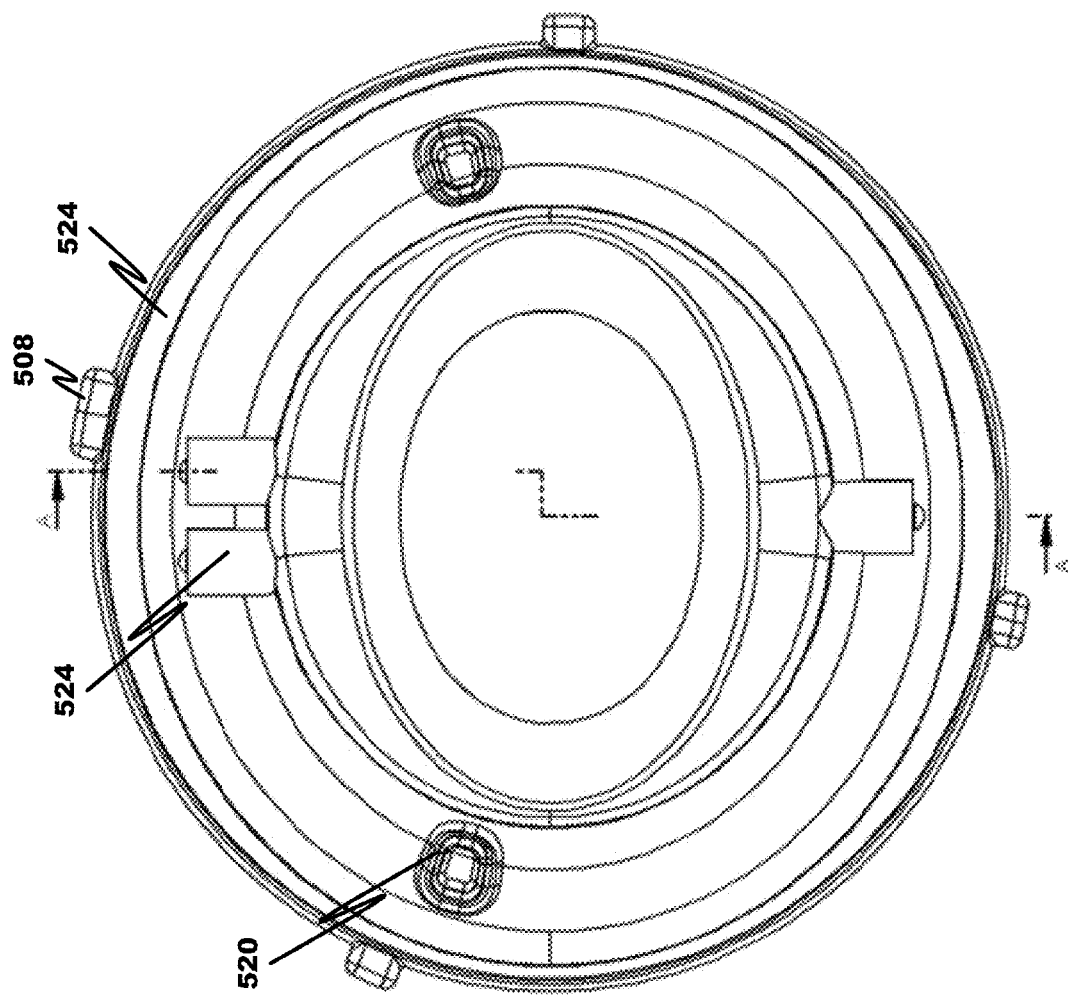
FIG. 25A is a plan view of the eye piece according to an embodiment.

In some embodiments, the base is placed in a holder which can be brought forward for loading and pushed back for placement under the ultrasonic welding horn. The fixture stretches the film over the top of the base by having two tensioned rollers 2200 and 2212. The eyecup and welding ring assembly is loaded into the welding horn after which the automatic welding cycle is initiated. As the horn comes down as shown in FIG. 24, the assembly contacts and pushes the membrane down towards the base which stretches and preforms the membrane, as well as cutting the film into the precise outer shape of the welding ring and base.

As will be appreciated, ultrasonic welding is an industrial process whereby high-frequency ultrasonic acoustic vibrations are locally applied to work pieces being held together under pressure to create a solid-state weld. It is commonly used for plastic and metals, and especially for, joining dissimilar materials. In ultrasonic welding, there are typically no connective bolts, nails, soldering materials, or adhesives necessary to bind the materials together. When used to, join metals, the temperature stays well below the melting point of the involved materials, preventing any unwanted properties which may arise from high temperature exposure of the metal. The parts are sandwiched between a fixed shaped nest (anvil) and a sonotrode (horn) connected to a transducer, and a ~20 kHz low-amplitude acoustic vibration is emitted. Common frequencies used in ultrasonic welding of thermoplastics are 15 kHz, 20 kHz, 30 kHz, 35 kHz, 40 kHz and 70 kHz. When welding plastics, the interface of the two parts is specially designed to concentrate the melting process. One of the materials usually has a spiked or rounded energy director, such as energy director 705, which contacts the second plastic part. The ultrasonic energy melts the point contact between the parts, creating a joint. Ultrasonic welding of thermoplastics causes local melting of the plastic due to absorption of vibrational energy along the joint to be welded. In metals welding occurs due to high-pressure dispersion of surface oxides and local motion of the materials. Although there is heating, it is not enough to melt the base materials.

Once welding is completed the assembled eyepiece is removed from the fixture and film roll, and the film is advanced to be in position for the next welding cycle.

It is also possible to paint a bar or alphanumeric code on the membrane or base member of the eye piece such that it can be read by a video camera when the video camera is in recording mode. This system would not significantly affect the transmission of acoustic energy during scanning.

A number of variations and modifications of the disclosed subject matter can be used. As will be appreciated, it would be possible to provide for some features of the disclosure without providing others.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. An eyepiece for an ultrasonic imaging device, comprising:
   a base member having a first central opening;
   an eye cup comprising an eye seal collar surrounding a second central opening and an elongated tongue extending peripherally from and surrounding the eye seal collar, the eye seal collar being configured to engage an eye socket of a patient and the first and second central openings being positioned to pass ultrasound pulses to image an eye of the patient;
   a welding ring comprising a third central opening to receive the eye seal collar of the eye cup such that the eye seal collar extends through the third central opening to engage the eye socket of the patient; and
   a liquid impermeable membrane positioned below the second central opening of the eye cup and above the third central opening to define first and second chambers to contain water to propagate the ultrasound pulses, wherein the elongated tongue is positioned between the liquid impermeable membrane and the welding ring and the elongated tongue comprises a raised annular feature configured to engage an annular channel to inhibit leakage of water at an interface between the elongated tongue and the base member, wherein the welding ring comprises an energy director on a lower surface, and wherein the energy director engages the liquid impermeable membrane and base member, whereby the energy director is configured to be ultrasonically melted when in contact with the liquid impermeable membrane and base member.

2. The eyepiece of claim 1, wherein the elongated tongue comprises a second raised annular feature configured to engage a second annular channel to further inhibit leakage of water at the interface between the elongated tongue and base member.

3. The eyepiece of claim 1, wherein the raised annular feature and second raised annular feature are located on a common first surface of the elongated tongue.

4. The eyepiece of claim 3, wherein the annular channel and second annular channel are located on the elongated tongue adjacent to the raised annular feature and second raised annular feature, respectively.

5. The eyepiece of claim 3, wherein a second surface of the elongated tongue comprises a shoulder extending upwardly from the second surface to engage a groove in the welding ring.

6. The eyepiece of claim 1, wherein the energy director extends around a periphery of the welding ring outside of a periphery of the elongated tongue to form a bond around the periphery of the interface between the welding ring and the base member.

7. The eyepiece of claim 6, wherein the liquid impermeable membrane is in a continuous sheet and wherein the energy director is positioned to contact the liquid impermeable membrane, whereby melting of the energy director causes separation of the liquid impermeable membrane into separate parts.

8. The eyepiece of claim 1, wherein an interface between the welding ring and the elongated tongue of the eye cup, the interface between the elongated tongue and the liquid impermeable membrane, and an interface between the base member and liquid impermeable membrane are each free of adhesive and the liquid impermeable membrane is impermeable to selected biological microbes, the microbes being selected from the group consisting of bacterium, virus, and fungus.

9. An eyepiece for an ultrasonic imaging device, comprising:
   a base member having a first central opening;
   an eye cup comprising an eye seal collar surrounding a second central opening and an elongated tongue extending peripherally from and surrounding the eye seal collar, the eye seal collar being configured to engage an eye socket of a patient and the first and second central openings being positioned to pass ultrasound pulses to image an eye of the patient;
   a welding ring comprising a third central opening to receive the eye seal collar of the eye cup such that the eye seal collar extends through the third central opening to engage the eye socket of the patient; and
   a liquid impermeable membrane positioned below the second central opening of the eye cup and above the third central opening to define first and second chambers to contain water to propagate the ultrasound pulses, wherein the elongated tongue is positioned between the liquid impermeable membrane and the welding ring and the elongated tongue comprises first and second raised annular features configured to engage first and second annular channels, respectively, to inhibit leakage of water at an interface between the elongated tongue and the base member, wherein the welding ring comprises an energy director on a lower surface, and wherein the energy director engages the liquid impermeable membrane and base member, whereby the energy director is configured to be ultrasonically melted when in contact with the liquid impermeable membrane and base member.

10. The eyepiece of claim 9, wherein the first and second raised annular features are located on a common first surface of the elongated tongue.

11. The eyepiece of claim 10, wherein the first and second annular channels are located on the elongated tongue adjacent to the first and second raised annular features, respectively.

12. The eyepiece of claim 10, wherein a second surface of the elongated tongue comprises a shoulder extending upwardly from the second surface to engage a groove in the welding ring.

13. The eyepiece of claim 9, wherein the energy director extends around a periphery of the welding ring outside of a periphery of the elongated tongue to form a strong-bond around the periphery of the interface between the welding ring and the base member.

14. The eyepiece of claim 13, wherein the liquid impermeable membrane is in a continuous sheet and wherein the energy director is positioned to contact the liquid impermeable membrane, whereby melting of the energy director causes separation of the liquid impermeable membrane into separate parts.

15. The eyepiece of claim 9, wherein an interface between the welding ring and the elongated tongue of the eye cup, the interface between the elongated tongue and the liquid impermeable membrane, and an interface between the base member and liquid impermeable membrane are each free of adhesive and the liquid impermeable membrane is impermeable to selected biological microbes, the microbes being selected from the group consisting of bacterium, virus, and fungus.

16. An eyepiece for an ultrasonic imaging device, comprising:
- a base member having a first central opening;
- an eye cup comprising an eye seal collar surrounding a second central opening and an elongated tongue extending peripherally from and surrounding the eye seal collar, the eye seal collar being configured to engage an eye socket of a patient and the first and second central openings being positioned to pass ultrasound pulses to image an eye of the patient;
- a welding ring comprising a third central opening to receive the eye seal collar of the eye cup such that the eye seal collar extends through the third central opening to engage the eye socket of the patient; and
- a liquid impermeable membrane positioned below the second central opening of the eye cup and above the third central opening to define first and second chambers to contain water to propagate the ultrasound pulses, wherein the elongated tongue is positioned between the liquid impermeable membrane and the welding ring and the elongated tongue comprises first and second raised annular features configured to engage first and second annular channels, respectively to inhibit leakage of water at an interface between the elongated tongue and the base member, wherein the first and second raised annular features are located on a common first surface of the elongated tongue and wherein the first and second annular channels are located on the elongated tongue adjacent to the first and second raised annular features, respectively, and wherein the welding ring comprises an energy director on a lower surface, wherein the energy director engages the liquid impermeable membrane and base member, whereby the energy director is configured to be ultrasonically melted when in contact with the liquid impermeable membrane and base member.

17. The eyepiece of claim 16, wherein the energy director extends around a periphery of the welding ring outside of a periphery of the elongated tongue to form a bond around the periphery of the interface between the welding ring and the base member, wherein the liquid impermeable membrane is in a continuous sheet, and wherein the energy director is positioned to contact the liquid impermeable membrane, whereby melting of the energy director causes separation of the liquid impermeable membrane into separate parts.

18. The eyepiece of claim 16, wherein an interface between the welding ring and the elongated tongue of the eye cup, the interface between the elongated tongue and the liquid impermeable membrane, and an interface between the base member and liquid impermeable membrane are each free of adhesive.

* * * * *